United States Patent
Claridge et al.

(10) Patent No.: US 11,731,349 B2
(45) Date of Patent: Aug. 22, 2023

(54) THERMOPLASTIC PARTICULATES COMPRISING A CARBOXYLIC ACID-BASED SINTERING AID AND ADDITIVE MANUFACTURING THEREWITH

(71) Applicant: Xerox Corporation, Norwalk, CT (US)

(72) Inventors: Robert Claridge, Kitchener (CA); Cristina Resetco, Toronto (CA); Richard Philip Nelson Veregin, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 86 days.

(21) Appl. No.: 17/071,255

(22) Filed: Oct. 15, 2020

(65) Prior Publication Data
US 2022/0118693 A1 Apr. 21, 2022

(51) Int. Cl.
*B33Y 70/10* (2020.01)
*B29C 64/153* (2017.01)
(Continued)

(52) U.S. Cl.
CPC .............. *B29C 64/153* (2017.08); *B29B 9/12* (2013.01); *B29C 64/314* (2017.08); *B33Y 10/00* (2014.12); *B33Y 80/00* (2014.12); *B29K 2075/02* (2013.01); *B29K 2101/12* (2013.01); *B29K 2105/251* (2013.01)

(58) Field of Classification Search
CPC ........... B33Y 10/00; C08J 3/128; C08K 5/098
See application file for complete search history.

(56) References Cited

U.S. PATENT DOCUMENTS

| 4,863,646 A | 9/1989 | Watanabe et al. |
| 2011/0177444 A1 | 7/2011 | Mattison, Jr. et al. |

(Continued)

FOREIGN PATENT DOCUMENTS

| EP | 3789443 A1 | 3/2021 |
| EP | 3789457 A1 | 3/2021 |

OTHER PUBLICATIONS

Goran Flodberg, Pore analysis and mechanical performance of selective laser sintered objects, Additive Manufacturing 24 (2018) 307-315.

(Continued)

*Primary Examiner* — James Sanders
(74) *Attorney, Agent, or Firm* — Vorys, Safer, Seymour and Pease LLP

(57) ABSTRACT

Additive manufacturing processes featuring consolidation of thermoplastic particulates may form printed objects in a range of shapes. Nanoparticles disposed upon the outer surface of the thermoplastic particulates may improve flow performance of the thermoplastic particulates during additive manufacturing, but may lead to excessive porosity following consolidation. Excessive porosity may be detrimental for performance applications requiring high mechanical strength. A carboxylic acid-based sintering aid, particularly a metal carboxylate, may decrease porosity of consolidated parts following sintering without substantially increasing blocking in a powder bed. Particulate compositions suitable for additive manufacturing may comprise: a plurality of thermoplastic particulates comprising a carboxylic acid-based sintering aid admixed with a thermoplastic polymer, and a plurality of nanoparticles disposed upon an outer surface of the thermoplastic particulates.

17 Claims, 7 Drawing Sheets

(51) Int. Cl.
*B33Y 10/00* (2015.01)
*B33Y 80/00* (2015.01)
*B29C 64/314* (2017.01)
*B29B 9/12* (2006.01)
*B29K 75/00* (2006.01)
*B29K 101/12* (2006.01)
*B29K 105/00* (2006.01)

(56) References Cited

U.S. PATENT DOCUMENTS

2011/0244007 A1   10/2011   Matsui et al.
2015/0152214 A1   6/2015    Uenlue et al.
2017/0129177 A1   5/2017    Hattig et al.
2018/0244862 A1   8/2018    Price

OTHER PUBLICATIONS

Zhi Zeng, Improvement on Selective Laser Sintering and Post-Processing of Polystyrene, Polymers, Jun. 1, 2019.
Ksawery Szykiedans, Selected mechanical properties of PETG 3-D prints, XXI International Polish-Slovak Conference "Machine Modeling and Simulations 2016", Procedia Engineering 177 ( 2017 ) 455-461.
Samuel Clark Ligon, Polymers for 3D Printing and Customized Additive Manufacturing, 2017 American Chemical Society,Chem. Rev. 2017, 117, 10212-10290.
Extended European Search Report for corresponding EP Application No. 21198399.4 dated Mar. 14, 2022.

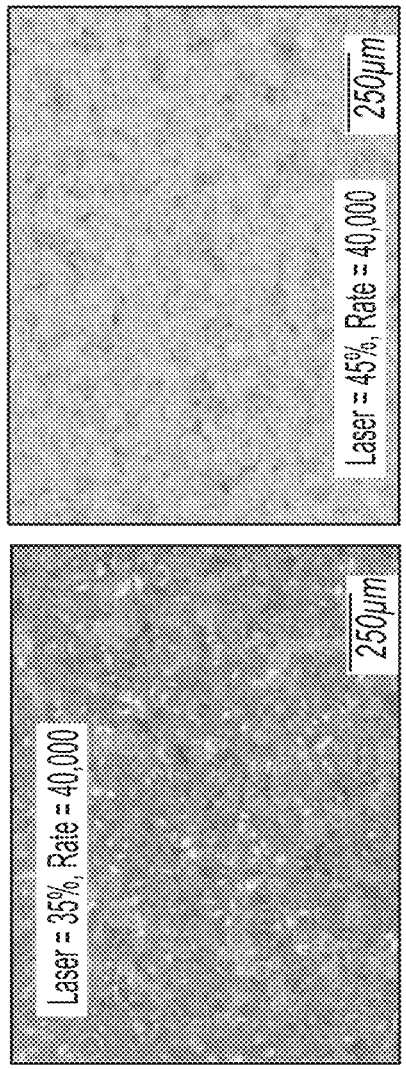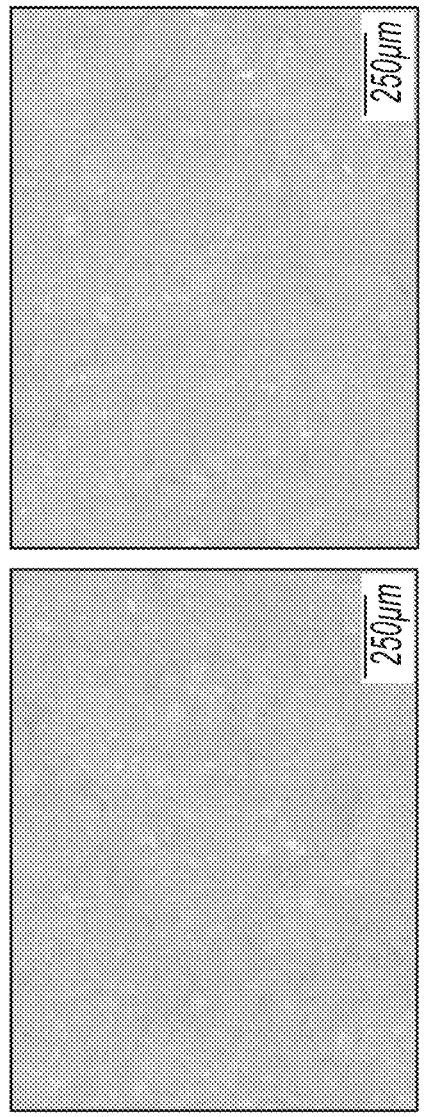

THERMOPLASTIC PARTICULATES COMPRISING A CARBOXYLIC ACID-BASED SINTERING AID AND ADDITIVE MANUFACTURING THEREWITH

CROSS-REFERENCE TO RELATED APPLICATIONS

Not applicable.

FIELD

The present disclosure generally relates to additive manufacturing, more particularly additive manufacturing processes featuring consolidation of powder particulates having enhanced sintering properties.

BACKGROUND

Additive manufacturing, also known as three-dimensional (3-D) printing, is a rapidly growing technology area. Although additive manufacturing has traditionally been used for rapid prototyping activities, this technique is being increasingly employed for producing commercial and industrial parts (printed objects) in any number of complex shapes. Additive manufacturing processes operate by layer-by-layer deposition of either 1) a stream of molten printing material or a liquid precursor to a printing material, or 2) powder particulates of a printing material. The layer-by-layer deposition usually takes place under control of a computer to deposit and consolidate the printing material in precise locations based upon a digital three-dimensional computer-aided design model ("blueprint") of the part to be manufactured. Powder bed fusion (PBF) of powder particulates is an especially beneficial additive manufacturing method. In a particular example, consolidation of powder particulates may take place in a powder bed deposited layer-by-layer using a three-dimensional printing system that employs a laser or electron beam to heat precise locations of the powder bed, thereby consolidating specified powder particulates to form a part having a predetermined shape. Selective laser sintering (SLS) represents a particular example of a process suitable for promoting localized consolidation of powder particulates during powder bed fusion to form a part in a desired shape. Other particulate consolidation techniques that may be similarly employed include, for example, electron beam melting (EBM), binder jetting and multi jet fusion (MJF).

Among the powder particulates suitable for use in three-dimensional printing are those comprising thermoplastic polymers. Although a wide array of thermoplastic polymers are known, there are relatively few having properties compatible for use in current three-dimensional printing techniques employing particulate consolidation. Thermoplastic polymers suitable for undergoing particulate consolidation into parts include those having a significant difference between the onset of melting and the onset of crystallization, which may promote good structural and mechanical integrity following directed heating to promote particulate consolidation. Ready formation of particulates suitable for undergoing deposition is another significant consideration.

For satisfactory printing performance to be realized, thermoplastic particulates need to maintain good flow properties in the solid state. Flow properties may be evaluated, for example, by measuring the fraction of thermoplastic particulates from a sample that are able to pass through a standard sieve of a specified size and/or by measuring of the angle of repose. High fractions of sievable thermoplastic particulates may be indicative of the thermoplastic particulates existing as non-agglomerated, substantially individual particulates, which may be characteristic of ready powder flow. Lower values of the angle of repose, in contrast, may be characteristic of ready powder flow. A relatively narrow particle size distribution and regularity of the particulate shape in a sample may also facilitate good powder flow performance. Substantial absence of particulate fines may also be desirable for promoting good powder flow performance.

Thermoplastic particulates are oftentimes obtained commercially by cryogenic grinding or precipitation processes, which may result in irregular particulate shapes and wide particle size distributions. Irregular particulate shapes and wide particle size distributions may result in poor powder flow performance and extensive void formation during three-dimensional printing processes. Poor powder flow performance may be addressed to some degree through dry blending with fillers and flow aids, but these additives may have limited effectiveness with softer polymer materials, such as elastomers, due to particulate aggregation.

Void formation may be more difficult to address. Extensive void formation during particulate consolidation may significantly decrease the ultimate material strength of a printed object compared to that otherwise obtainable through casting or machining of the same thermoplastic polymer. Therefore, it can be desirable for good flow performance to be realized once thermoplastic particulates have been liquefied in order to promote good particulate consolidation. Without being bound by theory, powder bed fusion and similar particulate consolidation processes performed in the absence of external pressure may limit the flow of liquefied thermoplastic polymer and lead to void formation, especially when consolidating powder particulates having a non-optimal size and or shape profile.

Thermoplastic particulates may also be formed by melt emulsification processes, such as described in U.S. Pat. No. 4,863,646, which is incorporated herein by reference in its entirety. In melt emulsification processes, a thermoplastic polymer is dispersed as liquefied droplets in a carrier fluid, in which the thermoplastic polymer has no or minimal solubility above the polymer's melting point or softening temperature. Upon cooling the liquefied droplets below the melting point or softening temperature, thermoplastic particulates having a substantially spherical shape may be formed, albeit with a wide particle size distribution. As such, the thermoplastic particulates remain non-ideally suited for three-dimensional printing processes.

The particle size distribution of thermoplastic particulates formed during melt emulsification can be narrowed significantly by incorporating a plurality of nanoparticles into the carrier fluid, as described in U.S. patent application Ser. No. 16/946,622, filed on Jun. 30, 2020 and incorporated herein by reference. Thermoplastic particulates formed in this manner may feature at least a partial coating of nanoparticles upon the particulate surface, wherein the nanoparticles are robustly adhered to and/or embedded in the particulate surface. The adhered/embedded nanoparticles may promote much better powder flow performance than that obtained when dry blending a flow aid with uncoated thermoplastic particulates. The narrow particle size distribution of thermoplastic particulates having a nanoparticle coating thereon may allow ready sintering with a manageable amount of void formation to be realized in many instances. Although satisfactory in numerous cases, the nanoparticle coating may limit robust coalescence between the thermoplastic particulates and result in porosity values that may be higher than desirable. Without being bound by theory, these issues may arise from increased surface viscosity and decreased polymer-polymer cohesion due to the presence of the nanoparticles. While the mechanical strength of printed objects formed though particulate consolidation of nanoparticle-coated thermoplastic particulates may be adequate in many instances, as well as when consolidating non-coated thermoplastic particulates, the limited mechanical strength may be unsatisfactory for some performance applications requiring especially high structural integrity.

SUMMARY

The present disclosure provides particulate compositions suitable for additive manufacturing. The particulate compositions comprise: a plurality of thermoplastic particulates comprising a carboxylic acid-based sintering aid admixed with a thermoplastic polymer, and a plurality of nanoparticles disposed upon an outer surface of the thermoplastic particulates.

The present disclosure also provides methods for forming consolidated parts using the particulate compositions. The methods comprise: providing a particulate composition of the present disclosure; depositing the particulate composition layer-by-layer in a powder bed; and heating a portion of the powder bed to consolidate a portion of the thermoplastic particulates into a consolidated part having a specified shape.

Consolidated parts of the present disclosure formed in accordance with the above may comprise a thermoplastic matrix formed by consolidation of thermoplastic particulates, and nanoparticles and carboxylic acid-based sintering aid admixed with the thermoplastic matrix.

The present disclosure also provides methods for forming particulate compositions suitable for additive manufacturing. The methods comprise: combining a thermoplastic polymer, nanoparticles and a carboxylic acid-based sintering aid with a carrier fluid at a heating temperature at or above a melting point or a softening temperature of the thermoplastic polymer; wherein the thermoplastic polymer and the carrier fluid are substantially immiscible at the heating temperature; applying sufficient shear to disperse the thermoplastic polymer as liquefied droplets in the presence of the nanoparticles and the carboxylic acid-based sintering aid in the carrier fluid at the heating temperature; after liquefied droplets have formed, cooling the carrier fluid to at least a temperature at which thermoplastic particulates in a solidified state form, the thermoplastic particulates comprising the thermoplastic polymer, at least a portion of the nanoparticles, and at least a portion of the sintering aid; wherein at least a majority of the nanoparticles are disposed upon an outer surface of the thermoplastic particulates; and separating the thermoplastic particulates from the carrier fluid.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

FIGS. 2A and 2B show optical images of the polyurethane particulates of Comparative Example 2 after laser sintering at 30% and 45% laser power, respectively, a scan rate of 40,000 and a temperature of 108° C. FIGS. 3A and 3B show optical images of the polyurethane particulates of Example 4 after laser sintering under the same conditions as Comparative Example 2.

DETAILED DESCRIPTION

Figure 1:
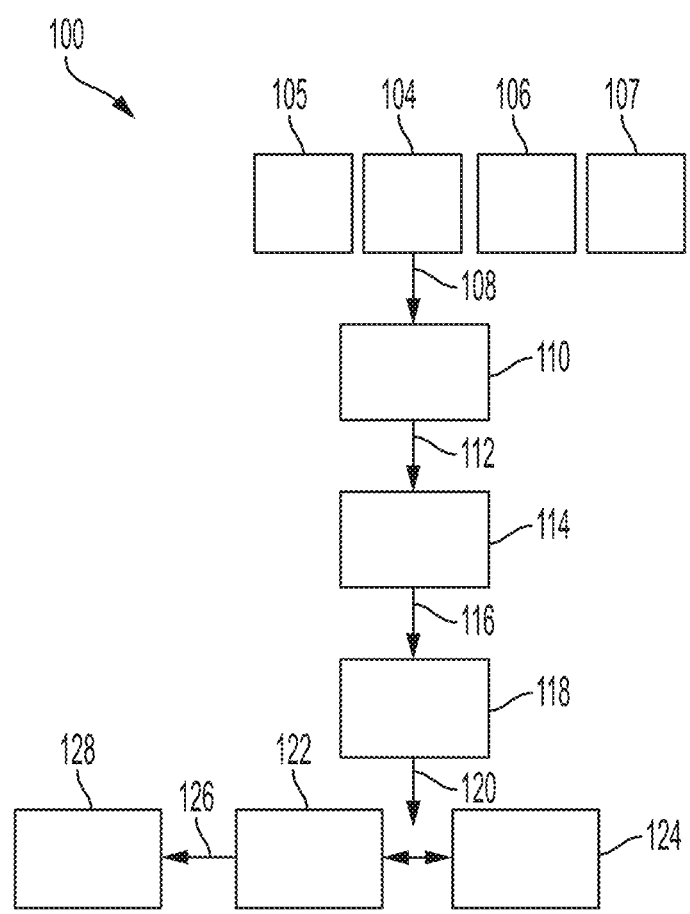
FIG. 1 is a flow chart of a non-limiting example method for producing thermoplastic particulates in accordance with the present disclosure.

The present disclosure generally relates to additive manufacturing, more particularly additive manufacturing processes featuring consolidation of powder particulates having enhanced sintering properties.

As discussed above, thermoplastic particulates comprising a thermoplastic polymer may be suitable for use in three-dimensional printing processes, particularly those employing selective laser sintering to consolidate specified locations of a powder bed to form a part having a predetermined shape. Commercially sourced thermoplastic particulates presently may be obtained in irregular shapes and/or with wide particle size distributions, which may lead to poor flow performance and/or incomplete particulate consolidation during printing. Melt emulsification processes employing nanoparticles during thermoplastic particulate formation may afford thermoplastic particulates having high sphericity and narrow particle size distributions. Nanoparticle-coated thermoplastic particulates may undergo ready sintering to form consolidated parts having a manageable amount of void formation, which may afford sufficient mechanical strength for many applications.

For performance applications requiring especially high structural integrity, an increased extent of particulate consolidation may be desirable. In the case of nanoparticle-coated thermoplastic particulates, improved particulate consolidation and decreased void formation may be realized to some degree by decreasing the loading of nanoparticles. However, the optimization window for achieving improved particulate consolidation in this manner may be rather limited, since poor powder flow performance may be realized if the nanoparticle loading becomes too low, with high void volumes and part defects again occurring following particulate consolidation. Thus, it may be very difficult to strike a balance between adequate powder flow performance and good liquid flow performance when consolidating thermoplastic powder particulates.

The present disclosure demonstrates that a sintering aid, specifically a carboxylic acid-based sintering aid having a sufficiently low melting point, may be effectively incorporated in melt emulsification processes and become admixed within a thermoplastic matrix defining thermoplastic particulates formed therefrom. Surprisingly, the carboxylic acid-based sintering aid may negligibly impact the size and size distribution of thermoplastic particulates formed from melt emulsification in the presence of nanoparticles. Suitable carboxylic acid-based sintering aids may include various low-melting metal carboxylate salts formed from fatty acids or dicarboxylic acids, as discussed in further detail below. The corresponding free carboxylic acids may also comprise suitable carboxylic acid-based sintering aids in some cases and may be suitably utilized if a particular metal carboxylate salt is unavailable or has a melting point that is too high. Suitable carboxylic acid-based sintering aids, including metal carboxylate salts formed from free carboxylic acids, may be selected such that the melting point is high enough to avoid particulate aggregation during sintering but low enough to be below the sintering temperature used. The melting point of the carboxylic acid-based sintering aid may also be above the temperature at which melt emulsification formation of the thermoplastic particulates occurs. The carboxylic acid-based sintering aids may allow sintering of thermoplastic particulates to take place at lower temperatures and at lower laser powers than would otherwise be possible. Suitable carboxylic acid-based sintering aids may also decrease the porosity of consolidated parts formed from the thermoplastic particulates, such as through decreasing surface viscosity and promoting polymer-polymer cohesion, thereby providing access to performance parts having high structural integrity requirements. Under certain conditions, the carboxylic acid-based sintering aid may allow essentially complete fusion of thermoplastic particulates to take place (instead of leaving a discernible particulate structure following consolidation), thereby providing access to parts having minimal porosity and/or a glossy finish. Thus, the present disclosure may considerably widen the breadth of applications for which nanoparticle-coated thermoplastic particulates may be effectively used for forming consolidated parts of various types. Suitable nanoparticles compatible for use with metal carboxylate sintering aids are discussed in further detail below. Consolidation of thermoplastic particulates lacking a nanoparticle coating may similarly be enhanced through implementation of the disclosure herein.

Blocking refers to the tendency of powder particulates in a heated powder bed to stick together, even in locations where no additional energy input is being provided to promote consolidation of specified powder particulates. Blocking may be problematic and limit one's ability to form a consolidated part in a specified shape using thermoplastic particulates. Surprisingly, the carboxylic acid-based sintering aids disclosed herein may promote little to no blocking when thermoplastic particulates of the present disclosure are deposited in a heated powder bed.

In a further surprising result, nanoparticles may be precoated with a carboxylic acid-based sintering aid, particularly a metal carboxylate salt sintering aid formed from a fatty acid, to realize further advantages during melt emulsification formation of thermoplastic particulates. For example, a metal carboxylate salt sintering aid (e.g., zinc stearate) may be precoated on silica nanoparticles by roll milling and then employed to form thermoplastic particulates having a narrower particle size distribution than obtained when combining the nanoparticles and the metal carboxylate salt separately in the melt emulsification medium (carrier fluid).

Terms used in the description and claims herein have their plain and ordinary meaning, except as modified by the paragraphs below.

As used herein, the term "thermoplastic polymer" refers to a polymer material that softens and hardens reversibly on heating and cooling above a specified temperature (e.g., melting point, softening point, glass transition temperature, or the like). Thermoplastic polymers encompass both elastomeric and non-elastomeric thermoplastic polymers.

As used herein, the term "nanoparticle" refers to a particulate material having a particle size ranging from about 1 nm to about 500 nm.

As used herein, the term "oxide" refers to both metal oxides and non-metal oxides. For purposes of the present disclosure, silicon is considered to be a metal.

As used herein, the term "oxide nanoparticles" refers to a particulate material having a particle size ranging from about 1 nm to about 500 nm and comprising a metal oxide or a non-metal oxide.

As used herein, the term "associated" refers to chemical bonding, physical admixture with a matrix, or physical adherence to a surface.

As used herein, the terms "admixed," "admixture" or like related terms refer to dissolution of a first substance in a second substance or dispersion of a first substance as a solid in a second substance, wherein the dispersion may be uniform or non-uniform. Admixture encompasses blending of the two substances together in a manner such that the first substance is at located at least partially within the interior of the second substance. As such, blending processes leading to admixture are distinguishable from processes leading to disposition of the first substance only upon the surface of the second substance, such as may occur during dry blending processes.

As used herein, the term "$D_{10}$" refers to a diameter at which 10% of the sample (on a volume basis unless otherwise specified) is comprised of particles having a diameter less than said diameter value. As used herein, the term "$D_{50}$" refers to a diameter at which 50% of the sample (on a volume basis unless otherwise specified) is comprised of particles having a diameter less than said diameter value. $D_{50}$ may also be referred to as the "average particle size." As used herein, the term "$D_{90}$" refers to a diameter at which 90% of the sample (on a volume basis unless otherwise specified) is comprised of particles having a diameter less than said diameter value.

As used herein, the terms "diameter span," "span" and "span size" provide an indication of the breadth of a particle size distribution and is calculated as $(D_{90}-D_{10})/D_{50}$ (again, each D-value is based on volume, unless otherwise specified).

As used herein, the term "shear" refers to stirring or a similar process that induces mechanical agitation in a fluid.

As used herein, the term "embed" relative to nanoparticles and a surface of a thermoplastic particulate refers to the nanoparticles being at least partially extended into the surface such that polymer is in contact with the nanoparticles to a greater degree than would occur if the nanoparticles were simply laid on the surface, thereby contacting the surface tangentially.

As used herein, the terms "circularity" and "sphericity" refer to how close a particulate or a plurality of particulates is to a perfect sphere. To determine circularity, optical microscopy images are taken of the particulates. The perimeter (P) and area (A) of a particulate in the plane of the microscopy image is calculated (e.g., using a SYSMEX FPIA 3000 particle shape and particle size analyzer, available from Malvern Instruments). The circularity of a particulate is CEA/P, where CEA is the circumference of a circle having the area equivalent to the area (A) of the actual particulate.

As used herein, the viscosity of carrier fluids refer to the kinematic viscosity at 25° C., unless otherwise specified, and are measured per ASTM D445-19, unless otherwise specified.

As used herein, the term "carboxylic acid-based" refers to both free carboxylic acids and metal carboxylate salts. For purposes of the present disclosure, ammonium-based cations are considered to constitute a metal.

The melting point of a thermoplastic polymer herein, unless otherwise specified, is determined by ASTM E794-06(2018) with 10° C./min ramping and cooling rates.

The softening temperature or softening point of a thermoplastic polymer herein, unless otherwise specified, is determined by ASTM D6090-17. The softening temperature can be measured by using a cup and ball apparatus available from Mettler-Toledo using a 0.50 gram sample with a heating rate of 1° C./min.

Particulate compositions of the present disclosure may comprise a plurality of thermoplastic particulates comprising a carboxylic acid-based sintering aid admixed with a thermoplastic polymer, and a plurality of nanoparticles disposed upon an outer surface of the thermoplastic particulates. The carboxylic acid-based sintering aid may be blended with the thermoplastic polymer in a manner such that a thermoplastic matrix defining the thermoplastic particulates contains the carboxylic acid-based sintering aid and, optionally, the carboxylic acid-bases sintering aid is located upon the exterior of the thermoplastic particulates. As such, a carboxylic acid-based sintering aid dry blended with previously formed thermoplastic particulates is not considered to be admixed with the thermoplastic particulates in the disclosure herein, since the carboxylic acid-based sintering aid does not enter the interior portions of thermoplastic particulates during dry blending.

The plurality of nanoparticles may comprise oxide nanoparticles, carbon black, or any combination thereof. Oxide nanoparticles suitable for use in the present disclosure may include, for example, silica nanoparticles, titania nanoparticles, zirconia nanoparticles, alumina nanoparticles, iron oxide nanoparticles, copper oxide nanoparticles, tin oxide nanoparticles, boron oxide nanoparticles, cerium oxide nanoparticles, thallium oxide nanoparticles, tungsten oxide nanoparticles, or any combination thereof. Mixed oxides formed as nanoparticles, such as aluminosilicates, borosilicates, and aluminoborosilicates, for example, are also encompassed by the term "oxide" and may be suitable for use in the disclosure herein. The oxide nanoparticles may be hydrophilic or hydrophobic in nature, which may be native to the nanoparticles or result from surface treatment of the nanoparticles. For example, silica nanoparticles having a hydrophobic surface treatment, such as dimethylsilyl, trimethylsilyl, or the like, may be formed through reacting hydrophilic surface hydroxyl groups with an appropriate functionalizing agent. Hydrophobically functionalized oxide nanoparticles may be particularly desirable in the methods and compositions of the present disclosure, although unfunctionalized oxide nanoparticles or hydrophilically modified oxide nanoparticles may also be suitable for use as well. For example, hydrophobically functionalized oxide nanoparticles may be particularly compatible with the hydrophobic fluids used in melt emulsification processes.

Silica nanoparticles, particularly fumed silica nanoparticles with a hydrophobic functionalization thereon, may be especially suitable for use in the disclosure herein, since a variety of functionalized silicas are available, with the type of hydrophobic functionalization and the particle size being widely variable. Silazane and silane hydrophobic functionalizations are facile hydrophobic functionalizations that may be used in the present disclosure. As such, the nanoparticles used in the disclosure herein may comprise or consist essentially of silica nanoparticles, particularly silica nanoparticles that are hydrophobically functionalized. Silica nanoparticles may be used in combination with another type of oxide nanoparticle or non-oxide nanoparticle, wherein the other type of oxide or non-oxide nanoparticle may convey specified properties to the thermoplastic particulates, or a consolidated object formed therefrom, that are not attained when using silica nanoparticles alone.

Hydrophobic functionalization may make silica nanoparticles less compatible with water than are unfunctionalized silica nanoparticles. Desirably, hydrophobic functionalization may improve the dispersion of silica nanoparticles in the highly hydrophobic carrier fluids employed in melt emulsification. Suitable hydrophobic functionalization may be non-covalently or covalently attached to a surface of the silica nanoparticles. Covalent attachment may take place, for example, through functionalization of surface hydroxyl groups on the surface of the silica nanoparticles. In a non-limiting example, silica nanoparticles may be treated with hexamethyldisilazane to afford covalent attachment of a hydrophobic modification. Commercially available hydrophobically functionalized silica nanoparticles include, for example, Aerosil RX50 (Evonik, average particle size=40 nm) and Aerosil R812S (Evonik, average particle size=7 nm).

Carbon black is another type of nanoparticle that may be present upon thermoplastic particulates in the disclosure herein. Various grades of carbon black will be familiar to one having ordinary skill in the art, any of which may be suitable for use in the disclosure herein. Carbon black, silica, and other types of oxide nanoparticles may be present in combination with one another in some instances.

Polymer nanoparticles are another type of nanoparticle that may be present upon thermoplastic particulates in the disclosure herein. Suitable polymer nanoparticles may include one or more polymers that are thermosetting and/or crosslinked, such that they do not melt when processed by melt emulsification or a similar particulate formation technique according to the disclosure herein. Nanoparticles comprising high molecular weight thermoplastic polymers having suitably high melting or decomposition points may similarly be used to promote particulate formation in the disclosure herein.

The loading and particle size of silica nanoparticles or other types of nanoparticles upon thermoplastic particulates may vary over a wide range in the disclosure herein. The loading of the silica nanoparticles or similar types of nanoparticles may depend upon the nanoparticle concentration in a carrier fluid used to promote formation of the thermoplastic particulates, as described further below. In non-limiting examples, the concentration of nanoparticles in the carrier fluid may range from about 0.01 wt. % to about 10 wt. %, or about 0.05 wt. % to about 10 wt. %, or about 0.05 wt. % to about 5 wt. %, or about 0.1 wt. % to about 2 wt. %, or about 0.25 wt. % to about 1.5 wt. %, or about 0.2 wt. % to about 1.0 wt. %, or about 0.25 wt. % to about 1 wt. %, or about 0.25 wt. % to about 0.5 wt. % with respect to the weight of the thermoplastic polymer. The particle size of the nanoparticles may range from about 1 nm to about 100 nm, although particles sizes up to about 500 nm may also be acceptable. In non-limiting examples, the particle size of the nanoparticles may range from about 5 nm to about 75 nm, or about 5 nm to about 50 nm, or about 5 nm to about 10 nm, or about 10 nm to about 20 nm, or about 20 nm to about 30 nm, or about 30 nm to about 40 nm, or about 40 nm to about 50 nm, or about 50 nm to about 60 nm. The nanoparticles, particularly silica nanoparticles and similar oxide nanoparticles, may have a BET surface area of about 10 $m^2/g$ to about 500 $m^2/g$, or about 10 $m^2/g$ to about 150 $m^2/g$, or about 25 $m^2/g$ to about 100 $m^2/g$, or about 100 $m^2/g$ to about 250 $m^2/g$, or about 250 $m^2/g$ to about 500 $m^2/g$.

Particular examples of oxide nanoparticles suitable for use in the disclosure herein include those treated with an alkyl silane, such as hexamethyldisilazane (HMDS), dimethyldichlorosilane, or other long-chain alkyl silanes such as decyltriethoxysilane or octyltriethoxysilane, for example. Suitable oxide nanoparticles may vary from about 7 nm to about 130 nm in size. Specific commercial examples of hydrophobically treated silicas, their particle sizes, and their hydrophobic treatment include the following: Wacker HDK® H13TD (16 nm, PDMS), HDK® H13TM (16 nm, HMDS), HDK® H13TX (16 nm, HMDS/PDMS), HDK® H20TD (12 nm, PDMS), HDK® H20TM (12 nm, HMDS), HDK® H20TX (12 nm, HMDS/PDMS), HDK® H30TD (8 nm, PDMS), HDK® H30TM (8 nm, HMDS), HDK® H30TX (8 nm, HMDS/PDMS), HDK® H3004 (12 nm, HMDS), HDK® HO5TD (40 nm, PDMS), HDK® HO5TM (40 nm, HMDS), HDK® HO5TX (40 nm, HMDS/PDMS); Evonik R972 (16 nm, DDS), RY200S (16 nm, PDMS, BET surface area=200 $m^2/g$), R202 (16 nm, PDMS), R974 (12 nm, DDS), RY200 (12 nm, PDMS), RX200 (12 nm, HMDS), R8200 (12 nm, HMDS), R805 (12 nm, alkyl silane), R104 (12 nm, alkyl silane), RX300 (7 nm, HMDS), R812 (7 nm, HMDS), R812S (7 nm, HMDS, BET surface area=300 $m^2/g$), R106 (7 nm, alkyl silane), NY50 (30 nm, PDMS), NAX50 (30 nm, HMDS), RY50 (40 nm, PDMS), and RX50 (40 nm, HMDS); Cabot TS530 (8 nm, HMDS); and Shin-Etsu sol-gel silicas X24-9163A (110 nm, HMDS, BET surface area=25 $m^2/g$) and X24-9600A-80 (80 nm, HMDS, BET=40 $m^2/g$).

Suitable oxide nanoparticles may also include treatments including bases or base salts. Specific commercial examples of such treated oxide nanoparticles, their particle sizes, and their treatment include the following: Wacker treated silicas HDK® H13TA (16 nm, PDMS —$NR_2/NR_3^+$), HDK® H30TA (8 nm, PDMS —$NR_2/NR_3^+$), HDK® H2015EP (12 nm, PDMS —$NR_2/NR_3^+$), HDK® H2050EP (10 nm, PDMS —$NR_2/NR_3^+$), HDK® H2150VP (10 nm, PDMS —$NR_2/NR_3^+$), and HDK® H3050VP (8 nm, PDMS —$NR_2/NR_3^+$).

Other suitable oxide nanoparticles, including both treated and untreated variants thereof, include titanates. Suitable titanates may include, for example, $CaTiO_3$, $BaTiO_3$, $MgTiO_3$, $MnTiO_3$, $SrTiO3$ and. $Al_2TiO_5$.

Also suitable are treated or untreated aluminum oxides. Specific commercial examples of aluminum oxides, their particle sizes, and their treatment include, for instance, Evonik C805 (13 nm, octylsilane), Aluminum Oxide C (13 nm, untreated), Aeroxide Alu C 100 (10 nm, untreated), Aeroxide Alu C 130 (13 nm, untreated); Cabot SpectrAL 81 (21 nm, untreated), and Cabot SpectrAl 100 (18 nm, untreated).

Still other suitable oxides include treated or untreated titanium dioxides. Examples of suitable commercial titanium dioxides include JMT-150IB from Tayca Corp., having a volume average particle diameter of 15 nm, JMT2000 from Tayca Corp., having particle dimensions of 15×15×40 nm, T805 from Evonik having a volume average particle diameter of about 21 nm, SMT5103 from Tayca Corporation having a particle size of about 40 nm, and STT-100H from Inabata America Corporation of average size of about 40 nm.

Based on turbidity measurements, about 80-90% of the available nanoparticles, such as silica nanoparticles, become associated with thermoplastic particulates formed through melt emulsification according to the disclosure herein. Since the loading of nanoparticles is measured relative to the thermoplastic polymer, the amount of nanoparticles associated with the thermoplastic particulates may be about 80-90% of the nanoparticle loading used when forming the elastomeric particulates. Higher or lower amounts of nanoparticles may become associated with the thermoplastic particulates for higher or lower nanoparticle loadings in the carrier fluid.

The thermoplastic particulates of the present disclosure may have the nanoparticles at least partially embedded in the outer surface of the thermoplastic particulates. When embedment occurs, a portion of the nanoparticle structure may be located in a crater or depression in the outer surface, thereby making it more difficult to dislodge the nanoparticles from the surface. It is to be appreciated that even when substantial embedment does not occur, appropriately functionalized nanoparticles, such as hydrophobically functionalized silica nanoparticles, may non-covalently associate (e.g., in a van der Waals-type interaction) to promote retention of the nanoparticles upon the outer surface.

Examples of thermoplastic polymers suitable for use in the disclosure herein include, but are not limited to, polyamides (e.g., Nylon-6, Nylon-12, and the like), polyurethanes, polyethylenes, polypropylenes, polyacetals, polycarbonates, polyethylene or polybutylene terephthalates, glycol-modified polyethelene or polybutylene terephthalates, polystyrenes, polyvinyl chlorides, polytetrafluoroethenes, polylactic acid and other polyesters, polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyaryl ether ketones (PAEK), polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the present disclosure. Any of the foregoing polymers may be thermoplastic elastomers and comprise a crystalline "hard" segment and an amorphous "soft" segment.

Particularly suitable examples of thermoplastic polymers for use in the disclosure herein may include polyamides, such as Nylon 6 or Nylon 12; acrylonitrile butadiene styrene; polylactic acid; polyurethanes; poly(arylene ether)s; polyaryletherketones; polycarbonates; polyimides; polyphenylene sulfides; poly(arylene sulfone)s; polyesters, such as polyethylene terephthalate or polybutylene terephthalate or glycol-modified variants thereof and any combination thereof.

More specific examples of suitable polyamides include, but are not limited to, polycaproamide (Nylon 6, polyamide 6, or PA6), poly(hexamethylene succinamide) (Nylon 46, polyamide 46, or PA46), polyhexamethylene adipamide (Nylon 66, polyamide 66, or PA66), polypentamethylene adipamide (Nylon 56, polyamide 56, or PA56), polyhexamethylene sebacamide (Nylon 610, polyamide 610, or PA610), polyundecaamide (Nylon 11, polyamide 11, or PA11), polydodecaamide (Nylon 12, polyamide 12, or PA12), and polyhexamethylene terephthalamide (Nylon 6T, polyamide 6T, or PA6T), Nylon 10.10 (polyamide 10.10 or PA10.10), Nylon 10.12 (polyamide 10.12 or PA10.12), Nylon 10.14 (polyamide 10.14 or PA10.14), Nylon 10.18 (polyamide 10.18 or PA10.18), Nylon 6.10 (polyamide 6.10 or PA6.10), Nylon 6.18 (polyamide 6.18 or PA6.18), Nylon 6.12 (polyamide 6.12 or PA6.12), Nylon 6.14 (polyamide 6.14 or PA6.14), semi-aromatic polyamide, the like, and any combination thereof. Copolyamides may also be used. Examples of suitable copolyamides include, but are not limited to, PA 11/10.10, PA 6/11, PA 6.6/6, PA 11/12, PA 10.10/10.12, PA 10.10/10.14, PA 11/10.36, PA 11/6.36, PA 10.10/10.36, and the like, and any combination thereof. Polyesteramides, polyetheresteramides, polycarbonate-esteramides, and polyether-block-amides, any which may be elastomeric, may also be used in the disclosure herein.

Examples of suitable polyurethanes include, but are not limited to, polyether polyurethanes, polyester polyurethanes, mixed polyether and polyester polyurethanes, the like, and any combination thereof. Suitable polyurethanes may include elastomeric polyurethanes, which are prepared by condensation of an isocyanate, a polyol, and a chain extender, where the polyols impart flexibility to the polymer chain and typically constitute a soft segment. Examples of suitable polyurethanes for use in the present disclosure include, but are not limited to, poly[4,4'-methylenebis(phenylisocyanate)-alt-1,4-butanediol/di(propylene glycol)/polycaprolactone], ELASTOLLAN® 1190A (a polyether polyurethane elastomer, available from BASF), the like, and any combination thereof.

Suitable polyesters are a condensation reaction product formed from a diacid and a diol, or a self-condensation reaction product of a hydroxyacid, such as lactic acid. Glycol-modified polyesters, such as glycol-modified polyethylene terephthalate or glycol-modified polybutylene terephthalate may be particularly suitable for use in combination with a carboxylic acid-based sintering aid according to the disclosure herein. Glycol modification may impart desirable benefits such as optical transparency and flexibility of the polymer chain.

Suitable thermoplastic polymers may be elastomeric or non-elastomeric. Some of the foregoing examples of thermoplastic polymers may be elastomeric or non-elastomeric depending on the specific composition of the polymer. For example, polyethylene that is a copolymer of ethylene and propylene may be elastomeric or not depending on the amount of propylene present in the polymer. HYTREL HTR 6108 is one suitable example of a glycol-modified polyethylene terephthalate.

Elastomeric thermoplastic polymers suitable for use in the disclosure herein generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Particular examples of elastomeric thermoplastic polymers can be found in Handbook of Thermoplastic Elastomers, 2nd ed., B. M. Walker and C. P. Rader, eds., Van Nostrand Reinhold, N.Y., 1988. Examples of suitable elastomeric thermoplastic polymers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of isoprene, isobutylene, butylene, ethylene/butylene, ethylene-propylene, and ethylene-ethylene/propylene. More specific elastomeric styrenic block copolymer examples include, but are not limited to, poly (styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

Any carboxylic acid or salt thereof which facilitates sintering of thermoplastic particulates by decreasing the porosity following sintering, increasing particulate fusion, and/or by decreasing the sintering temperature may be effectively employed as a carboxylic acid-based sintering aid in the disclosure herein. Suitable carboxylic acid-based sintering aids may accomplish the foregoing while leading to little or no blocking in a heated powder bed. Ammonium salts, including tetraalkylammonium compounds, may be utilized as alternative sintering aids in some cases.

Particularly suitable carboxylic acid-based sintering aids, such as metal carboxylates, may have a melting point of about 60° C. or greater or about 90° C. or greater, such as about 60° C. to about 300° C., or about 90° C. to about 300° C., or about 150° C. to about 300° C., or about 200° C. to about 300° C., such that they are compatible with the particulate deposition and consolidation conditions employed to form a consolidated part during 3-D printing. The carboxylic acid-based sintering aid may be selected such that the carboxylic acid-based sintering aid has a lower melting point than does the thermoplastic polymer comprising the thermoplastic particulates. Alternately, the carboxylic acid-based sintering aid may have a lower melting point than the sintering temperature employed to promote consolidation of the thermoplastic particulates, particularly in the case wherein the sintering temperature is less than the melting point of the thermoplastic polymer. If the melting point of the carboxylic acid-based sintering aid is too low, blocking may occur during particulate consolidation, especially for carboxylic acid-based sintering aid deposited upon the surface of the thermoplastic particulates. More preferably, suitable carboxylic acid-based sintering aids, such as metal carboxylates, may melt under melt emulsification conditions used to form the thermoplastic particulates, such as at a temperature ranging from about 200° C. to about 300° C. or about 200° C. to about 250° C. As such, particularly suitable carboxylic acid-based sintering aids, such as metal carboxylates, may have a melting point ranging from about 60° C. to about 300° C., or about 90° C. to about 300° C., or about 90° C. to about 250° C., or about 90° C. to about 200° C.

Suitable carboxylic acids or metal carboxylate forms thereof for use in the disclosure herein may be aliphatic or aromatic, linear or branched, cyclic or acyclic, saturated or unsaturated, or any combination thereof. Suitable metal carboxylates may include at least one salt selected from a metal monocarboxylate, a metal dicarboxylate, and any combination thereof. Metal monocarboxylates or metal dicarboxylates may comprise a monovalent metal cation, a divalent metal cation, a trivalent metal cation, or mixed metal salts containing any of monovalent, divalent or trivalent metal cations. Particularly suitable examples of metal carboxylate sintering aids may comprise a divalent or trivalent metal cation. More specific examples of suitable metal carboxylates follow hereinafter.

Metal carboxylates comprise a metal cation component and an anionic component comprising a carboxylate group appended to a hydrocarbyl moiety. The metal carboxylates may be formed from a reaction between a base and a carboxylic acid, wherein the metal cation component derives from the base and the anionic component derives from the carboxylic acid. Cation exchange may be performed to introduce metal cation components not readily introduced with a base. Suitable metal cation components may include an alkali metal cation, an alkaline earth metal cation, a transition metal cation, a main group metal cation, a lanthanide metal cation, or any combination thereof. Choice of a particular metal cation component for a specified carboxylate group may be selected to provide a melting point within the range of suitability for the metal carboxylate, as specified above. For example, if an alkali metal salt of a specified carboxylate group produces a melting point that is too high, a lower melting point may be realized by using a different salt form of the carboxylate, such as an alkaline earth metal cation form or a transition metal cation form. While the melting points of many metal carboxylates are known, many are unknown or not yet reported in the literature. Nevertheless, it is to be appreciated that melting points may be easily determined, and a person having ordinary skill in the art will be able to choose a suitable metal carboxylate for a given application having the benefit of the present disclosure. Both the metal cation component and the carboxylate moiety may be varied to achieve suitability for use in a given application.

Alkali metal cations may include Li, Na, K, Rb, and Cs cations. Alkali metal cations may be selected as the metal cation component for any of the metal carboxylates disclosed herein, provided that the melting point for the metal carboxylate falls within a suitable range.

Alkaline earth metal cations may include Be, Mg, Ca, Sr, and Ba cations. Alkaline earth metal cations may be selected as the metal cation component for any of the metal carboxylates disclosed herein, provided that the melting point for the metal carboxylate falls within a suitable range.

Main group metal cations may include Al, Ga, In, Tl, Sn, Pb, and Bi cations. Main group metal cations may be selected as the metal cation component for any of the metal carboxylates disclosed herein, provided that the melting point for the metal carboxylate falls within a suitable range.

Transition metal cations may include Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, and Hg cations, which may be present in any accessible oxidation state. Main group metal cations may be selected as the metal cation component for any of the metal carboxylates disclosed herein, provided that the melting point for the metal carboxylate falls within a suitable range.

Lanthanide metal cations may include La, Ce, Pr, Nd, Pm, Sm, Eu, Gd, Tb, Dy, Ho, Er, Tm, Yb, and Lu cations, which may reside in a +2 or +3 oxidation state, typically +3. Lanthanide metal cations may be selected as the metal cation component for any of the metal carboxylates disclosed herein, provided that the melting point for the metal carboxylate falls within a suitable range.

In some embodiments, the carboxylic acid-based sintering aid may comprise a dicarboxylic acid or a metal carboxylate formed therefrom. Suitable metal carboxylates formed from a dicarboxylic acid may comprise a monovalent metal cation, a divalent metal cation, a trivalent metal cation, or any combination thereof, particularly a divalent metal cation or a trivalent metal cation. Such metal dicarboxylates may comprise an acid component derived from saturated or unsaturated dicarboxylic acids containing from about 2 to about 100 carbon atoms, or from about 2 to about 20 carbon atoms, or from about 4 to about 16 carbon atoms, or from about 2 to about 10 carbon atoms. Particular examples of suitable dicarboxylic acids may include, but are not limited to, terephthalic acid, phthalic acid, isophthalic acid, fumaric acid, maleic acid, itaconic acid, succinic acid, dodecylsuccinic acid, dodecenylsuccinic acid, oxalic acid, malonic acid, glutaric acid, adipic acid, pimelic acid, suberic acid, azelaic acid, dodecanediacid, malic acid, sebacic acid, the like, and any combination thereof. Other suitable dicarboxylic acids which may be utilized for forming a metal carboxylate include those containing a $C_3$ to $C_6$ cycloaliphatic ring, such as cyclohexanedicarboxylic acid, cyclopentanedicarboxylic acid, cyclobutanedicarboxylic acid, or cyclopropanedicarboxylic acid. A hydrophobic tail may extend from the dicarboxylic acid at a location between the carboxylic acid groups.

In some embodiments, the carboxylic acid-based sintering aid may comprise a monocarboxylic acid or a metal carboxylate formed therefrom. Suitable metal carboxylates formed from a monocarboxylic acid may comprise at least one metal monocarboxylate comprising a monovalent metal cation, a divalent metal cation, a trivalent metal cation, or any combination thereof, particularly a divalent metal cation or a trivalent metal cation. Metal monocarboxylates may comprise an acid component derived from saturated or unsaturated carboxylic acids containing from about 6 carbon atoms or more, Or about 8 carbon atoms or more, or about 10 carbon atoms or more, or about 12 carbon atoms or more, or about 14 carbon atoms or more, or about 16 carbon atoms or more, or about 18 carbon atoms or more, or about 20 carbon atoms or more, or about 22 carbon atoms or more, or about 24 carbon atoms or more. In more specific embodiments, the metal carboxylate may comprise an acid component derived from a monocarboxylic acid comprising 2 to about 30 carbon atoms, or 3 to about 26 carbon atoms, or 4 to about 24 carbon atoms, or 6 to about 20 carbon atoms, or 8 to about 18 carbon atoms. Metal carboxylates formed from a monocarboxylic acid having about 12 carbon atoms or less may be used in combination with a more hydrophobic saturated or unsaturated carboxylic acid, such as those comprising, about 6 carbon atoms or more, or about 10 carbon atoms or more, or about 12 carbon atoms or more, or about 14 carbon atoms or more, or about 16 carbon atoms or more, or about 18 carbon atoms or more, or about 20 carbon atoms or more, or about 22 carbon atoms or more, or about 24 carbon atoms or more. Some metal formates also possess sufficient thermal stability and may be used as well, either alone or in combination with a more hydrophobic saturated or unsaturated carboxylic acid. Particular examples of suitable monocarboxylic acids may include, but are not limited to, acetic acid, propionic acid, butyric acid, isobutyric acid, valeric acid, isovaleric acid, caproic acid, caprylic acid, capric acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, carboceric acid, montanic acid, nonacosylic acid, mellisic acid, hentriacontylic acid, lacceronic acid, psyllic acid, geddic acid, ceroplastic acid, hexatriacontylic acid, heptatriacontylic acid, octatriacontylic acid, nonatriacontylic acid, and tetracontylic acid. The foregoing acids are saturated monocarboxylic acids. Unsaturated monocarboxylic acids may also be used to form metal monocarboxylates suitable for use in the disclosure herein. Suitable unsaturated monocarboxylic acids may include, for example, crotonic acid, cervonic acid, linoleic acid, linolelaidic acid, linolenic acid, arachidonic acid, docosatetraenoic acid, myristoleic acid, palmitoleic acid, sappenic acid, vaccenic acid, paullinic acid, oleic acid, pinolenic acid, stearidonic acid, eleostearic acid, elaidic acid, gondoic acid, gadoleic acid, erucic acid, eicosenoic acid, eicosadiencoic acid, eicosatrienoic acid, eicosatetraenoic acid, docosadienoic acid, nervonic acid, mead acid, adrenic acid, and the like. Suitable aromatic carboxylic acids may include benzoic acid, naphthoic acid, or substituted variants thereof. Substituted variants of benzoic acid and naphthoic acid may bear a $C_1$-$C_{40}$ saturated or unsaturated hydrocarbyl group, $C_1$-$C_{10}$ saturated or unsaturated hydrocarbyl group, or $C_{11}$-$C_{30}$ saturated or unsaturated hydrocarbyl group at any open valence position of the aromatic ring with respect to the carboxylic acid group and/or a heteroatom functional group at any open valence position of the aromatic ring with respect to the carboxylic acid group. Hydrocarbyl groups that may be present in suitable aromatic carboxylic acids include, for example, linear or branched alkyl or alkenyl groups. Specific examples of aromatic acids that may comprise the acid component of a metal monocarboxylate in the disclosure herein include, for example, benzoic acid, naphthoic acid, toluic acid, hydroxybenzoic acids including salicylic acid, hydroxynaphthoic acids, or the like. Other suitable monocarboxylic acids which may suitably comprise the acid component in the metal monocarboxylates include those containing a C3 to C6 cycloaliphatic ring, such as cyclohexanecarboxylic acid, cyclopentanecarboxylic acid, cyclobutanecarboxylic acid, or cyclopropanecarboxylic acid. Any free carboxylic acid from the foregoing may also be utilized as a carboxylic acid-based sintering aid in the disclosure herein, provided that the melting point is within a satisfactory range (e.g., about 60° C. to about 300° C.).

In a particular example, the carboxylic acid-based sintering aid may comprise a stearate salt, such as zinc stearate, calcium stearate, or like stearate salts comprising a divalent metal cation. Stearate salts comprising a trivalent metal cation, such as aluminum stearate may also be used in the disclosure herein. Stearate salts comprising a monovalent metal cation, such as alkali metal stearate salts may also be suitably used in the disclosure herein.

Loading of the carboxylic acid-based sintering aid in a thermoplastic matrix defining the thermoplastic particulates disclosed herein may range from about 0.05 wt. % to about 5 wt. %, or about 0.05 wt. % to about 2 wt. %, as measured relative to the thermoplastic polymer. The loading of the carboxylic acid-based sintering aid may represent an amount effective to promote sintering and decrease void formation, while not promoting blocking when disposed in a heated powder bed.

In non-limiting examples, thermoplastic particulates of the disclosure herein may be formed through melt emulsification. Such methods for producing thermoplastic particulates may comprise combining a thermoplastic polymer, nanoparticles and a carboxylic acid-based sintering aid, such as a metal carboxylate, with a carrier fluid at a heating temperature at or above a melting point or softening temperature of the thermoplastic polymer; wherein the thermoplastic polymer and the carrier fluid are substantially immiscible at the heating temperature; applying sufficient shear to disperse the thermoplastic polymer as liquefied droplets in the presence of the nanoparticles and the carboxylic acid-based sintering aid at the heating temperature; after liquefied droplets have formed, cooling the carrier fluid to at least a temperature at which thermoplastic particulates in a solidified state form, the thermoplastic particulates comprising the thermoplastic polymer, at least a portion of the nanoparticles disposed upon an outer surface of the thermoplastic particulates, and at least a portion of the carboxylic acid-based sintering aid; and separating the thermoplastic particulates from the carrier fluid. Of the nanoparticles associated with the thermoplastic particulates, at least a majority of the nanoparticles are disposed upon an outer surface of the thermoplastic particulates.

FIG. 1 is a flow chart of non-limiting example method 100 for producing thermoplastic particulates in accordance with the present disclosure. As shown, thermoplastic polymer 105, carrier fluid 104, nanoparticles 106, and carboxylic acid-based sintering aid 107 are combined 108 to produce mixture 110. Thermoplastic polymer 105, carrier fluid 104, nanoparticles 106, and carboxylic acid-based sintering aid 107 may be combined 108 in any order, with mixing and/or heating being conducted. Optionally, carboxylic acid-based sintering aid 107 may be precoated upon nanoparticles 106, such as through roll milling. In a particular example, carrier fluid 104 may be heated above a melting point or softening temperature of thermoplastic polymer 105 before combining the other components therewith. Alternately, all the components may be mixed together in carrier fluid 104 and then heated above the melting point or softening temperature. Carboxylic acid-based sintering aid 107 may also melt at the heating temperature used to promote melting or softening of thermoplastic polymer 105. Nanoparticles 106 may remain as a solid at the heating temperature so that they can become disposed upon the outer surface of the resulting thermoplastic particulates.

Heating above the melting point or softening temperature of thermoplastic polymer 105 may be at any temperature below the decomposition temperature or boiling point of any of the components in the melt emulsion. In non-limiting examples, heating at a temperature about 1° C. to about 50° C., or about 1° C. to about 25° C., or about 5° C. to about 30° C., or about 20° C. to about 50° C. above the melting point or softening temperature of thermoplastic polymer 105 may be conducted. Carboxylic acid-based sintering aid 107 may have a melting point above or below that of thermoplastic polymer 105. In the disclosure herein, melting points may be determined by ASTM E794-06(2018) with 10° C./min ramping and cooling rates. The softening temperature or softening point of a thermoplastic polymer, unless otherwise specified, may be determined by ASTM D6090-17. The softening temperature can be measured by using a cup and ball apparatus available from Mettler-Toledo using a 0.50 gram sample with a heating rate of 1° C./min. Melting points or softening temperatures of thermoplastic polymer 105 in the present disclosure may range from about 50° C. to about 400° C. In more particular examples, the heating temperature may range from about 100° C. to about 300° C. or about 200° C. to about 250° C., provided that thermoplastic polymer 105 melts or softens within this range.

Mixture 110 is then processed 112 by applying sufficient shear to produce liquefied droplets of thermoplastic polymer 105 at a temperature greater than the melting point or softening temperature of thermoplastic polymer 105, thereby forming melt emulsion 114. Without being limited by theory, it is believed that, all other factors being the same, increasing shear may decrease the size of the liquefied droplets in carrier fluid 104. It is to be understood that at some point there may be diminishing returns on increasing shear and decreasing the droplet size in turn and/or disruptions to the droplet contents at higher shear rates. Examples of mixing apparatuses suitable for producing melt emulsion 114 include, but are not limited to, extruders (e.g., continuous extruders, batch extruders and the like), stirred reactors, blenders, reactors with inline homogenizer systems, and the like, and apparatuses derived therefrom.

In non-limiting examples, the liquefied droplets may have a size of about 1 μm to about 1,000 μm, or about 1 μm to about 500 μm, or about 1 μm to about 200 μm, or about 1 μm to about 150 μm, or about 1 μm to about 130 μm, or about 1 μm to about 100 μm, or about 10 μm to about 150 μm, or about 10 μm to about 100 μm, or about 20 μm to about 80 μm, or about 20 μm to about 50 μm, or about 50 μm to about 90 μm. The resulting thermoplastic particulates formed after solidification may reside within similar size ranges. That is, the thermoplastic particulates in the particulate compositions and methods of the present disclosure may have a size of about 1 μm to about 1,000 μm, or about 1 μm to about 500 μm, or about 1 μm to about 200 μm, or about 1 μm to about 150 μm, or about 1 μm to about 130 μm, or about 1 μm to about 100 μm, or about 1 μm to about 200 μm, or about 10 μm to about 100 μm, or about 20 μm to about 80 μm, or about 20 μm to about 50 μm, or about 50 μm to about 90 μm. Particle size measurements may be made by analysis of optical images or using onboard software of a Malvern Mastersizer 3000 Aero S instrument, which uses light scattering techniques for particle size measurement.

For light scattering techniques, glass bead control samples with a diameter within the range of 15 μm to 150 μm under the tradename Quality Audit Standards QAS4002™ obtained from Malvern Analytical Ltd. may be used. Samples may be analyzed as dry powders dispersed in air using the dry powder dispersion module of the Mastersizer 3000 Aero S. Particle sizes may be derived using the instrument software from a plot of volume density as a function of size.

Melt emulsion 114 is then cooled 116 to solidify the liquefied droplets into thermoplastic particulates in a solidified state. The cooling rate may range from about 100° C./sec to about 10° C./hour or about 10° C./sec to about 10° C./hr, including any cooling rate in between. Shear may be discontinued during cooling, or may be maintained at the same rate or a different rate during cooling. Cooled mixture 118 can then be treated 120 to isolate thermoplastic particulates 122 from other components 124 (e.g., carrier fluid 104, excess nanoparticles 106, excess carboxylic acid-based sintering aid 107, and the like). Washing, filtering and/or the like may be conducted at this stage to purify thermoplastic particulates 122 further, wherein thermoplastic particulates 122 comprise thermoplastic polymer 105, at least a portion of nanoparticles 106 coating the outer surface of thermoplastic particulates 122, and at least a portion of carboxylic acid-based sintering aid 107 being admixed with a thermoplastic matrix comprising thermoplastic particulates 122. Depending upon non-limiting factors such as the temperature (including cooling rate), the type of thermoplastic polymer 105, and the types and sizes of nanoparticles 106, nanoparticles 106 may become at least partially embedded within the outer surface of thermoplastic particulates 122 in the course of becoming disposed thereon. Even without embedment taking place, nanoparticles 106 may remain robustly associated with thermoplastic particulates 122 to facilitate their further use.

In the foregoing, thermoplastic polymer 105 and carrier fluid 104 are chosen such that these components are immiscible or substantially immiscible (<1 wt. % solubility) at the various processing temperatures (e.g., from room temperature to the temperature at which liquefied droplets are formed and maintained as two or more phases).

After separating thermoplastic particulates 122 from other components 124, further processing 126 of thermoplastic particulates 122 may take place. In a non-limiting example further processing 126 may include, for example, sieving thermoplastic particulates 122 and/or blending thermoplastic particulates 122 with other substances to form processed thermoplastic particulates 128. Processed thermoplastic particulates 128 may be formulated for use in a desired application, such as additive manufacturing in a non-limiting example.

The thermoplastic particulates may have a bulk density of about 0.3 g/cm$^3$ to about 0.8 g/cm$^3$, or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$.

Shear sufficient to form liquefied droplets may be applied through stirring the carrier fluid in particular examples of the present disclosure. In non-limiting examples, the stirring rate may range from about 50 rotations per minute (RPM) to about 1500 RPM, or about 250 RPM to about 1000 RPM, or about 225 RPM to about 500 RPM, or about 1000 RPM to about 2000 RPM. The stirring rate while melting the thermoplastic polymer may be the same as or different than the stirring rate used once liquefied droplets have formed. The liquefied droplets may be stirred over a stirring time of about 30 seconds to about 18 hours or longer, or about 1 minute to about 180 minutes, or about 1 minute to about 60 minutes, or about 5 minutes to about 6 minutes, or about 5 minutes to about 30 minutes, or about 10 minutes to about 30 minutes, or about 30 minutes to about 60 minutes.

Loading (concentration) of the thermoplastic polymer in the carrier fluid may vary over a wide range. In non-limiting examples, the loading of the thermoplastic polymer in the carrier fluid may range from about 1 wt. % to about 99 wt. % relative to the weight of the carrier fluid. In more particular examples, the loading of the thermoplastic polymer may range from about 5 wt. % to about 75 wt. %, or about 10 wt. % to about 60 wt. %, or about 20 wt. % to about 50 wt. %, or about 20 wt. % to about 30 wt. %, or about 30 wt. % to about 40 wt. %, or about 40 wt. % to about 50 wt. %, or about 50 wt. % to about 60 wt. % relative to the weight of the carrier fluid. The thermoplastic polymer may be present in an amount ranging from about 5 wt. % to about 60 wt. %, or about 5 wt. % to about 25 wt. %, or about 10 wt. % to about 30 wt. %, or about 20 wt. % to about 45 wt. %, or about 25 wt. % to about 50 wt. %, or about 40 wt. % to about 60 wt. % relative to a combined amount of the thermoplastic polymer and the carrier fluid.

Upon forming thermoplastic particulates in the presence of nanoparticles according to the disclosure herein, at least a portion of the nanoparticles, such as silica nanoparticles or other oxide nanoparticles, may be disposed as a coating or partial coating upon the outer surface of the thermoplastic particulates. The coating may be disposed substantially uniformly upon the outer surface in some cases. As used herein with respect to a coating, the term "substantially uniform" refers to an even coating thickness in surface locations covered by the nanoparticles, particularly the entirety of the outer surface. Coating coverage upon the thermoplastic particulates may range from about 5% to about 100%, or about 5% to about 25%, or about 20% to about 50%, or about 40% to about 70%, or about 50% to about 80%, or about 60% to about 90%, or about 70% to about 100% of the surface area of the particulates. Coverage may be determined by image analysis of SEM micrographs.

Carrier fluids suitable for use in the disclosure herein include those in which the thermoplastic polymer is substantially immiscible with the carrier fluid, the carrier fluid has a boiling point exceeding the melting point or softening temperature of the thermoplastic polymer, and the carrier fluid has sufficient viscosity to form liquefied droplets of substantially spherical shape once the thermoplastic polymer has undergone melting therein. Suitable carrier fluids may include, for example, silicone oil, fluorinated silicone oils, perfluorinated silicone oils, polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof.

Suitable carrier fluids may have a density of about 0.6 $g/cm^3$ to about 1.5 $g/cm^3$, and the thermoplastic polymer may have a density of about 0.7 $g/cm^3$ to about 1.7 $g/cm^3$, wherein the thermoplastic polymer has a density similar to, lower than, or higher than the density of the carrier fluid.

Particularly suitable silicone oils are polysiloxanes. Illustrative silicone oils suitable for use in the disclosure herein include, for example, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, the like and any combination thereof.

In non-limiting examples, the carrier fluid and the thermoplastic polymer may be heated at a temperature of about 200° C. or above. Suitable heating temperatures may be chosen based upon the melting point or softening temperature of the thermoplastic polymer and the boiling point of the carrier fluid. The cooling rate following formation of liquefied polymer droplets may be varied as desired. In some instances, cooling may take place with heat dissipation to the surrounding environment taking place at an innate (uncontrolled) rate once heating is discontinued. In other cases, cooling at a controlled rate (e.g., by gradually decreasing the heating temperature and/or using jacketed temperature control to increase or decrease the rate of cooling may be employed.

Suitable carrier fluids, such as polysiloxanes, including PDMS, may have a viscosity at 25° C. of about 1,000 cSt to about 150,000 cSt, or about 1,000 cSt to about 60,000 cSt, or about 40,000 cSt to about 100,000 cSt, or about 75,000 cSt to about 150,000 cSt. The viscosity of the carrier fluid may be obtained from commercial suppliers or it may be measured, if desired, through techniques known to persons having ordinary skill in the art.

Separating the thermoplastic particulates from the carrier fluid may take place by any of a variety of known separation techniques. Any of gravity settling and filtration, decantation, centrifugation, or the like may be used to separate the thermoplastic particulates from the carrier fluid. The thermoplastic particulates may then be washed with a solvent in which the carrier fluid is soluble and the thermoplastic particulates are insoluble in the course of the separation process. In addition, a solvent in which the carrier fluid is soluble and the thermoplastic particulates are insoluble may be mixed with the carrier fluid and the thermoplastic particulates before initially separating the elastomeric particulates from the carrier fluid.

Suitable solvents for washing the thermoplastic particulates or mixing with the carrier fluid may include, but are not limited to, aromatic hydrocarbons (e.g., toluene and/or xylene), aliphatic hydrocarbons (e.g., heptane, n-hexane, and/or n-octane), cyclic hydrocarbons (e.g., cyclopentane, cyclohexane, and/or cyclooctane), ethers (e.g. diethyl ether, tetrahydrofuran, diisopropyl ether, and/or dioxane), halogenated hydrocarbons (e.g., dichloroethane, trichloroethane, dichloromethane, chloroform and/or carbon tetrachloride), alcohols (e.g., methanol, ethanol, isopropanol, and/or n-propanol), ketones (e.g., methyl ethyl ketone and/or acetone); esters (e.g., ethyl acetate and the like), water, the like, and any combination thereof. After washing the thermoplastic particulates, any of heating, vacuum drying, air drying, or any combination thereof may be performed.

At least a majority of the thermoplastic particulates obtained according to the disclosure here may be substantially spherical in shape. More typically, about 90% or greater, or about 95% or greater, or about 99% or greater of the thermoplastic particulates produced by melt emulsification according to the present disclosure may be substantially spherical in shape. In other non-limiting examples, the thermoplastic particulates of the present disclosure may have a sphericity (circularity) of about 0.9 or greater, including about 0.90 to about 1.0, or about 0.93 to about 0.99, or about 0.95 to about 0.99, or about 0.97 to about 0.99, or about 0.98 to 1.0. Sphericity (circularity) may be measured using a Sysmex FPIA-2100 Flow Particle Image Analyzer. To determine circularity, optical microscopy images are taken of the particulates. The perimeter (P) and area (A) of the particulates in the plane of the microscopy image is calculated (e.g., using a SYSMEX FPIA 3000 particle shape and particle size analyzer, available from Malvern Instruments). The circularity of the particulate is CEA/P, where CEA is the circumference of a circle having the area equivalent to the area (A) of the actual particulate.

The thermoplastic particulates of the present disclosure may have an angle of repose of about 25° to about 45°, or about 25° to about 35°, or about 30° to about 40°, or about 35° to about 45°. Angle of repose may be determined using a Hosokawa Micron Powder Characteristics Tester PT-R using ASTM D6393-14 "Standard Test Method for Bulk Solids Characterization by Carr Indices."

Thermoplastic particulates isolated from the carrier fluid according to the disclosure above may be further processed to make the thermoplastic particulates suitable for an intended application. In one example, the thermoplastic particulates may be passed through a sieve or similar structure having an effective screening size that is greater than the average particle size of the thermoplastic particulates. For example, an illustrative screening size for processing thermoplastic particulates suitable for use in three-dimensional printing may have an effective screening size of about 150 µm. When referring to sieving, pore/screen sizes are described per U.S.A. Standard Sieve (ASTM E11-17). Other screening sizes, either larger or smaller, may be more suitable for thermoplastic particulates destined for use in other applications. Sieving may remove larger particulates that may have formed during the melt emulsification process and/or remove agglomerated particulates that may have poor flow characteristics. In general, sieves having an effective screening size ranging from about 10 µm to about 250 µm may be used.

In addition, the thermoplastic particulates, including sieved thermoplastic particulates, may be mixed with one or more additional components such as flow aids, fillers or other substances intended to tailor the properties of the thermoplastic particulates for an intended application. Mixing of the additional components with the thermoplastic particulates may be conducted by dry blending techniques. Suitable examples of flow aids (e.g., carbon black, graphite, silica, and the like) and similar substances will be familiar to one having ordinary skill in the art. Such flow aids differ from the nanoparticles included in melt emulsification, since the flow aids are not robustly adhered to the surface of the thermoplastic particulates when dry blending is performed.

In particular applications, the compositions disclosed herein may be utilized in additive manufacturing processes, especially those employing selective laser sintering or other powder bed fusion processes to promote particulate consolidation. Additive manufacturing methods of the present disclosure may comprise providing a particulate composition of the present disclosure (a particulate composition comprising a plurality of thermoplastic particulates comprising a thermoplastic polymer, nanoparticles disposed on an outer surface of the thermoplastic particulates, and a carboxylic acid-based sintering aid admixed with a thermoplastic matrix of the thermoplastic particulates), depositing the particulate composition layer-by-layer in a powder bed, and heating a portion of the powder bed to consolidate a portion of the thermoplastic particulates into a consolidated part having a specified shape. The carboxylic acid-based sintering aid and the nanoparticles may remain associated with the consolidated part.

In particular process configurations, consolidation of the thermoplastic particulates may take place using selective laser sintering. Suitable conditions for performing selective laser sintering or other powder bed particulate consolidation processes to form a consolidated part are not believed to be especially limited. Lasers suitable for performing selective laser sintering may include both continuous wave lasers and pulsed wave lasers to provide the energy needed to promote consolidation of the thermoplastic particulates into a consolidated part. $CO_2$ lasers are commonly used to promote consolidation of thermoplastic particulates during additive manufacturing due to the high absorptivity of the polymers to the $CO_2$ laser emission wavelength. The operating conditions of the $CO_2$ laser or similar laser chosen to promote particulate consolidation may be chosen such that particulate consolidation occurs to a desired degree. Standard laser settings for promoting particulate consolidation (e.g., power, scanning rate, bed temperature, and the like) may be selected based on the knowledge of one having ordinary skill in the art. The choice of particular conditions for conducting selective laser sintering or similar particulate consolidation techniques may be influenced by non-limiting factors such as, for example, the type of thermoplastic polymer being used, the size and composition of the thermoplastic particulates, the type of printed object being produced, the type and amount of carboxylic acid-based sintering aid present, and the intended use conditions for the printed object. Choice of the sintering conditions may, in non-limiting examples, impact the porosity obtained following particulate consolidation. When employing a carboxylic acid-based sintering aid, as in the present disclosure, the consolidated parts may comprise a thermoplastic matrix having a porosity of about 10% or below, or about 5% or below, or about 2% or below, or about 1% or below.

Examples of printed objects formable using the particulate compositions disclosed herein are not considered to be particularly limited and may include, for example, containers (e.g., for food, beverages, cosmetics, personal care compositions, medicine, and the like), shoe soles, toys, furniture parts, decorative home goods, plastic gears, screws, nuts, bolts, cable ties, medical items, prosthetics, orthopedic implants, production of artifacts that aid learning in education, 3D anatomy models to aid in surgeries, robotics, biomedical devices (orthotics), home appliances, dentistry, automotive and airplane/aerospace parts, electronics, sporting goods, and the like. Many of these printed objects may benefit from the introduction of one or more conductive traces thereon, as discussed hereinafter.

Embodiments disclosed herein include:

A. Compositions comprising powder particulates. The compositions comprise: a plurality of thermoplastic particulates comprising a carboxylic acid-based sintering aid admixed with a thermoplastic polymer, and a plurality of nanoparticles disposed upon an outer surface of the thermoplastic particulates.

B. Methods for forming a printed object by particulate consolidation. The methods comprise: providing the particulate composition of Embodiment A; depositing the particulate composition layer-by-layer in a powder bed; and heating a portion of the powder bed to consolidate a portion of the thermoplastic particulates into a consolidated part having a specified shape.

C. Consolidated parts. The consolidated parts comprise: a thermoplastic matrix formed by consolidation of thermoplastic particulates, and nanoparticles and carboxylic acid-based sintering aid admixed with the thermoplastic matrix.

D. Methods for forming powder particulates. The methods comprise: combining a thermoplastic polymer, nanoparticles and a carboxylic acid-based sintering aid with a carrier fluid at a heating temperature at or above a melting point or a softening temperature of the thermoplastic polymer; wherein the thermoplastic polymer and the carrier fluid are substantially immiscible at the heating temperature; applying sufficient shear to disperse the thermoplastic polymer as liquefied droplets in the presence of the nanoparticles and the carboxylic acid-based sintering aid in the carrier fluid at the heating temperature; after liquefied droplets have formed, cooling the carrier fluid to at least a temperature at which thermoplastic particulates in a solidified state form, the thermoplastic particulates comprising the thermoplastic polymer, at least a portion of the nanoparticles, and at least a portion of the carboxylic acid-based sintering aid; wherein at least a majority of the nanoparticles are disposed upon an outer surface of the thermoplastic particulates; and separating the thermoplastic particulates from the carrier fluid.

Each of embodiments A, B, C and D may have one or more of the following additional elements in any combination:

Element 1: wherein the plurality of nanoparticles comprises oxide nanoparticles, carbon black, or any combination thereof.

Element 2: wherein the oxide nanoparticles comprise silica nanoparticles.

Element 3: wherein the carboxylic acid-based sintering aid comprises a metal carboxylate.

Element 4: wherein the metal carboxylate has a melting point of about 90° C. to about 300° C. or about 60° C. to about 300° C.

Element 5: wherein the metal carboxylate comprises at least one salt selected from the group consisting of a metal monocarboxylate, a metal dicarboxylate, and any combination thereof.

Element 6: wherein the metal carboxylate comprises at least one metal monocarboxylate comprising a monovalent metal cation, a divalent metal cation, or a trivalent metal cation.

Element 7: wherein the metal carboxylate comprises at least one metal monocarboxylate having about 6 carbon atoms or more.

Element 8: wherein the metal carboxylate comprises at least one metal monocarboxylate having about 10 carbon atoms or more.

Element 9: wherein the metal carboxylate comprises at least one metal monocarboxylate having about 16 carbon atoms or more.

Element 10: wherein the carboxylic acid-based sintering aid comprises a stearate salt.

Element 11: wherein the thermoplastic particulates have a $D_{50}$ ranging from about 1 μm to about 1,000 μm.

Element 12: wherein the thermoplastic particulates comprise about 0.05 wt. % to about 2 wt. % carboxylic acid-based sintering aid, as measured relative to the thermoplastic polymer.

Element 13: wherein the thermoplastic particulates comprise about 0.05 wt. % to about 5 wt. % nanoparticles, as measured relative to the thermoplastic polymer.

Element 14: wherein heating takes place by selective laser sintering.

Element 15: wherein the carboxylic acid-based sintering aid and the nanoparticles remain associated with the consolidated part.

Element 16: wherein the metal carboxylate has a melting point above the heating temperature.

Element 17: wherein the carrier fluid comprises a silicone oil.

Element 18: wherein the carboxylic acid-based sintering aid is precoated upon the nanoparticles prior to being combined with the carrier fluid.

By way of non-limiting example, exemplary combinations applicable to A, B, C and D include, but are not limited to: 1 or 2, and 3; 1 or 2, and 4; 1 or 2, and 5; 1 or 2, and 6; 1 or 2, and 7, 8, 9 or 10; 1 or 2, and 11; 1 or 2, and 12; 1 or 2, and 13; 3 and 4; 3 and 5; 3 and 6; 3, and 7, 8, 9 or 10; 3 and 11; 3 and 12; 3 and 13; 4 and 5; 4 and 6; 4, and 7, 8, 9 or 10; 4 and 11; 4 and 12; 4 and 13; 5, and 7, 8, 9 or 10; 5 and 11; 5 and 12; 5 and 13; 6, and 7, 8, 9 or 10; 6 and 11; 6 and 12; 6 and 13; 7, 8, 9 or 10, and 11; 7, 8, 9 or 10, and 12; 7, 8, 9 or 10, and 13; 11 and 12; 11 and 13; and 12 and 13. With respect to B-D, any of the foregoing may be in further combination with one or more of 14, 15, 16, 17 or 18.

To facilitate a better understanding of the present disclosure, the following examples of preferred or representative embodiments are given. In no way should the following examples be read to limit, or to define, the scope of the invention.

EXAMPLES

In the examples below, powder flow of thermoplastic particulates was characterized through sieving and angle of repose measurements. Sieving was conducted using a 150 μm U.S.A. Standard Sieve (ASTM E11) without particular conditions or duration of force. Angle of repose measurements were performed using a Hosokawa Micron Powder Characteristics Tester PT-R using ASTM D6393-14 "Standard Test Method for Bulk Solids Characterization by Carr Indices."

Average particle size measurements and particle size distributions were determined by light scattering using a Malvern Mastersizer 3000 Aero S particle size analyzer. For light scattering techniques, glass bead control samples having a diameter within the range of 15 μm to 150 μm under the tradename Quality Audit Standards QAS4002™ obtained from Malvern Analytical Ltd. may be used. Samples may be analyzed as dry powders dispersed in air using the dry powder dispersion module of the Mastersizer 3000 Aero S. Particle sizes may be derived using the instrument software from a plot of volume density as a function of size.

In the examples below, weight percentages are measured relative to the polymer.

Example 1: Polyester Particulates Formed in the Presence of Zinc Stearate. To a 500 mL glass kettle reactor equipped with a heating mantle was added 280 g of poly(dimethylsiloxane) (PDMS) (PSF-30000, Clearco), 0.25 g (0.20 wt. %) of AEROSIL RX50 silica nanoparticles (average particle size=40 nm, Evonik), 1.2 g (1.0 wt. %) of zinc stearate having a particle size of 4-6 μm (ZnFP, NOF Corporation) and 120 g of HYTREL® HTR 6108 pellets (polyester block copolymer comprising polybutylene terephthalate and long-chain glycol monomer units, DuPont). The reactor was set to a stirring rate of 300 RPM, and the temperature was raised to 240° C. over 30 minutes under flowing argon purge. Once the temperature reached 240° C., the stirring rate was increased to 500 RPM. After 60 minutes, heating and stirring were discontinued, and the slurry was allowed to cool to room temperature. The slurry was then diluted with heptane and filtered, and the particulates were then washed three times subsequently with heptane. After drying under vacuum overnight, the particulates were then sieved through a 150 μm filter.

Example 2: Polyester Particulates Formed in the Presence of Zinc Stearate. Example 2 was conducted in the same manner as Example 1, with the exception that 0.5 wt. % of AEROSIL RX50 silica nanoparticles was used.

Example 3: Polyester Particulates Formed in the Presence of Zinc Stearate. Example 3 was conducted in the same manner as Example 1, with the exception that 0.5 wt. % of AEROSIL RX50 and 0.5 wt. % of zinc stearate were used.

Example 3A: Polyester Particulates Formed in the Presence of Sodium Decanoate. Example 3A was conducted in the same manner as Example 3, with the exception that sodium decanoate was substituted for zinc stearate.

Example 3B: Polyester Particulates Formed in the Presence of Stearic Acid. Example 3B was conducted in the same manner as Example 3, with the exception that stearic acid was substituted for zinc stearate.

Example 4: Polyurethane Particulates Formed in the Presence of Zinc Stearate. Example 4 was conducted in the same manner as Example 1, with the exception that ELASTOLLAN 1190A10 (a polyether polyurethane elastomer having hardness Shore A 90) was used in place of HYTREL® HTR 6108. In addition, 0.5 wt. % AEROSIL RX50 and 0.5 wt. % zinc stearate were used.

Example 4A: Polyurethane Particulates Formed in the Presence of Zinc Stearate Precoated on Silica Nanoparticles. Example 4A was conducted in the same manner as Example 4, with the exception that the silica nanoparticles and zinc stearate were mixed and roll milled for 3 hours prior to addition to the PDMS and conducting melt emulsification.

Example 5: Polyurethane Particulates Formed in the Presence of Zinc Stearate. Example 5 was conducted in the manner as Example 4, with the exception that 1.0 wt. % AEROSIL RX50 and 0.2 wt. % zinc stearate were used.

Example 6: Polyurethane Particulates Formed in the Presence of Zinc Stearate. Example 6 was conducted in the manner as Example 4, with the exception that 1.0 wt. % AEROSIL RX50 and 0.5 wt. % zinc stearate were used.

Example 7: Polyurethane Particulates Formed in the Presence of Zinc Stearate. Example 6 was conducted in the manner as Example 4, with the exception that 0.5 wt. % AEROSIL RX50 and 1.0 wt. % zinc stearate were used.

Example 8: Polyurethane Particulates Formed in the Presence of Zinc Stearate. Example 6 was conducted in the manner as Example 4, with the exception that 0.5 wt. % AEROSIL RX50 and 0.1 wt. % zinc stearate were used.

Comparative Example 1: Polyester Particulates Formed in the Absence of Zinc Stearate. To a 500 mL glass kettle reactor equipped with a heating mantle was added 140 g of PDMS (PSF-10000), 0.6 g (1.0 wt. %) of AEROSIL RX50 silica nanoparticles, and 60 g of HYTREL® HTR 6108 pellets. The reactor was set to a stirring rate of 200 RPM, and the temperature was raised to 200° C. over 30 minutes under flowing argon purge. Once the temperature reached 200° C., the stirring rate was increased to 1000 RPM. After 60 minutes, heating and stirring were discontinued, and the slurry was allowed to cool to room temperature. The slurry was then diluted with heptane and filtered, and the particulates were then washed three times subsequently with heptane. After drying under vacuum overnight, the particulates were then sieved through a 150 μm filter.

Comparative Example 2: Polyurethane Particulates Formed in the Absence of Zinc Stearate. To a 2 L Buchi reactor was added 871 g of PDMS (PSF-10000), 50 g of a PDMS/AEROSIL RX50 slurry containing 2.9 g (0.5 wt. %) AEROSIL RX50 and 580 g of ELASTOLLAN 1190A10 polyurethane. The reactor was purged with nitrogen, and stirring was conducted at 200 RPM. The jacket temperature was increased to 240° C. over 60 minutes. Once the reactor temperature had reached 200° C., the stirring rate was increased to 500 RPM and the nitrogen flow was turned off. The slurry was stirred for 30 minutes at 240° C. and then discharged while hot. After cooling, the slurry was then washed twice with hexane, and the particulates were isolated by vacuum filtration. After drying under vacuum overnight, the particulates were then sieved through a 150 μm filter.

Tables 1 and 2 below summarize certain formation conditions and properties of thermoplastic particulates formed as above.

TABLE 1

| | Polyester Particulates | | | | | |
|---|---|---|---|---|---|---|
| | Comp. Example 1 | Example 1 | Example 2 | Example 3 | Example 3A | Example 3B |
| Polyester Mass | 60 g | 120 g | 120 g | 120 g | 120 g | 120 g |
| PDMS Mass | 140 g | 280 g | 280 g | 280 g | 280 g | 280 g |
| Silica Nanoparticles Mass (wt. %) | 0.25 g (1.0%) | 0.25 g (0.2%) | 0.6 g (0.5%) | 0.6 g (0.5%) | 0.6 g (0.5%) | 0.6 g (0.5%) |
| Zinc Stearate Mass (wt. %) | — | 1.2 g (1.0%) | 1.2 g (1.0%) | 0.6 g (0.5%) | — | — |
| Sodium Decanoate Mass (wt. %) | — | — | — | — | 0.6 g (0.5%) | — |
| Stearic Acid Mass (wt. %) | — | — | — | — | — | 0.6 g (0.5%) |
| Reactor | 500 mL kettle | 500 mL kettle | 500 mL kettle | 500 mL kettle | 500 mL kettle | 500 mL kettle |
| Temperature | 200° C. | 240° C. | 240° C. | 240° C. | 240° C. | 240° C. |
| RPM | 1000 | 500 | 500 | 500 | 500 | 500 |
| Reaction Time | 60 min | 60 min | 60 min | 60 min | 60 min | 60 min |
| Average Particle Size by Optical Microscopy | 57.3 μm | 44.6 μm | 49.3 μm | 56.5 μm | 82.8 μm | 62.8 μm |
| Span | 0.874 | 1.121 | 1.451 | 1.504 | 1.325 | 1.645 |
| Angle of repose | 29.8 | 39.4 | 35.6 | 32.9 | 30.7 | ND |

TABLE 2

Polyurethane Particulates

|  | Comp. Example 2 | Example 4 | Example 4A | Example 5 | Example 6 | Example 7 | Example 8 |
|---|---|---|---|---|---|---|---|
| Polyurethane Mass | 580 g | 120 g | 120 g | 120 g | 120 g | 120 g | 120 g |
| PDMS Mass | 871 g | 280 g | 280 g | 280 g | 280 g | 280 g | 280 g |
| Silica Nanoparticles Mass (wt. %) | 2.9 g (0.5%) | 0.6 g (0.5%) | 0.6 g (0.5%) | 1.2 g (1.0%) | 1.2 g (1.0%) | 0.5 g (0.5%) | 0.5 g (0.5%) |
| Zinc Stearate Mass (wt. %) | — | 0.6 g (0.5%) | 0.6 g (0.5%) | 0.24 g (0.2%) | 0.6 g (0.5%) | 1.2 g (1.0%) | 0.06 g (0.1%) |
| Reactor | 2 L Buchi | 500 mL kettle | 500 mL kettle | 500 mL kettle | 500 mL kettle | 500 mL kettle | 500 mL kettle |
| Temperature | 240° C. | 240° C. | 240° C. | 240° C. | 240° C. | 240° C. | 240° C. |
| RPM | 500 | 500 | 500 | 500 | 500 | 500 | 500 |
| Reaction Time | 30 min | 60 min | 60 min | 60 min | 60 min | 60 min | 60 min |
| Average Particle Size by Optical Microscopy | 56.3 μm | 42.4 μm | 53.1 | 30.3 μm | 38.4 μm | particles coalesced | 53.4 μm |
| Span | 0.59 | 1.359 | 0.708 | 0.621 | 2.02 | particles coalesced | 0.602 |
| Angle of repose | 32.4 | 39.4 | 30.9 | 34.8 | 40.9 | N/D | N/D |

As shown in Tables 1 and 2, inclusion of zinc stearate at various concentrations did not markedly alter the average particle size or angle of repose of the thermoplastic particulates produced during melt emulsification processing. Although the diameter span sometimes increased in the presence of zinc stearate, span values still remained within levels acceptable for use of the thermoplastic particulates in three-dimensional printing. Precoating the zinc stearate upon the silica nanoparticles narrowed the span and lowered the angle of repose compared to values obtained when separately adding these components during melt emulsification production of polyurethane particulates. Spherical polyester particulates were also obtained in the presence of sodium decanoate, albeit at a slightly larger particle size than polyester particulates prepared under identical conditions in the presence of zinc stearate. Stearic acid, in contrast, afforded spherical polyester particulates that were more similar in character to those produced in the presence of an equivalent amount of zinc stearate.

Particulate Consolidation-Polyurethane Particulates. Inclusion of zinc stearate during melt emulsification had a marked impact on the ease of sintering. FIGS. 2A and 2B show optical images of the polyurethane particulates of Comparative Example 2 after laser sintering at 30% and 45% laser power, respectively, a scan rate of 40,000 and temperature of 108° C. FIGS. 3A and 3B show optical images of the polyurethane particulates of Example 4 after laser sintering under the same conditions as the comparative example. As evident from comparison of the optical images, particulate consolidation was considerably more complete in the presence of the zinc stearate sintering aid than in its absence. Some blocking was observed when consolidating the polyurethane samples, even at a loading of 0.1-0.2 wt. % of the zinc stearate sintering aid. In the presence of silica nanoparticles and zinc stearate, Example 4 began sintering at about 35% laser power, whereas comparative Example 2 began sintering at about 25% laser power. Precoating the zinc stearate upon the silica nanoparticles in Example 4A lowered the laser power at which sintering commenced to about 30%.

Figure 4:
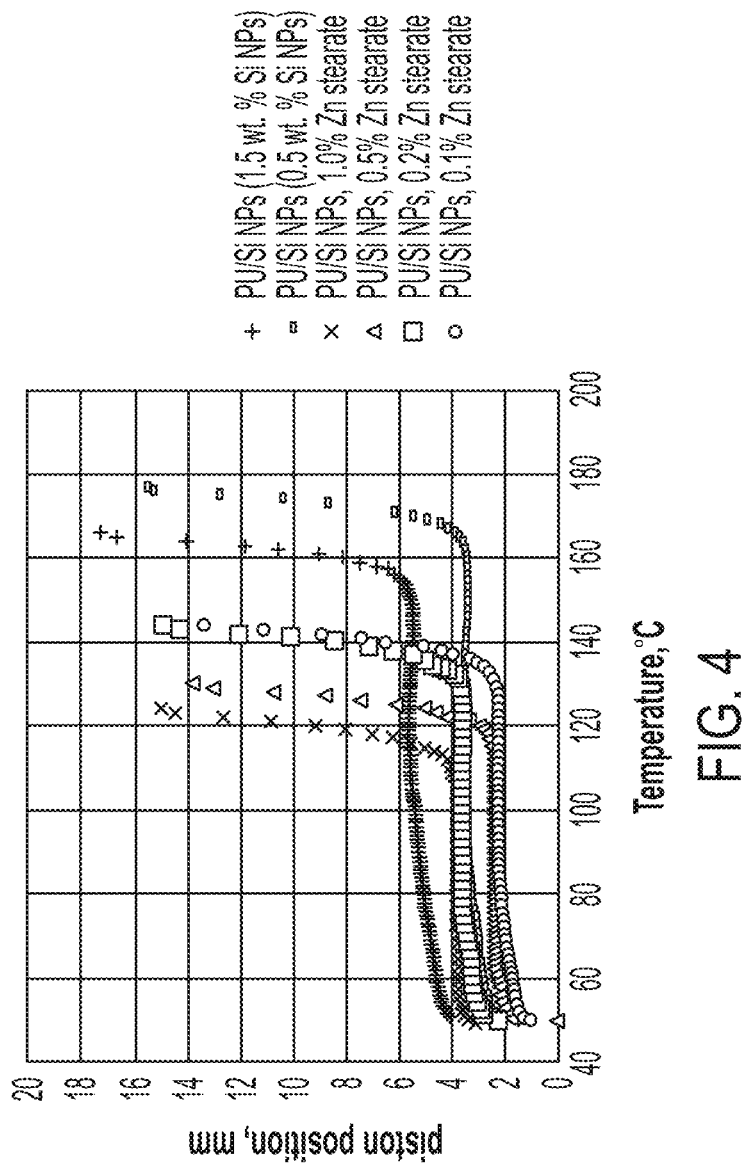
FIG. 4 is a plot showing the softening temperature of thermoplastic polyurethane particulates containing various loadings of zinc stearate sintering aid.

FIG. 4 is a plot showing the softening temperature of thermoplastic polyurethane particulates containing various loadings of zinc stearate sintering aid. As shown, thermoplastic polyurethane particulates containing only silica nanoparticles had a significantly greater sintering temperature. As shown, increasing amounts of zinc stearate steadily lowered the softening temperature.

Figure 5A:
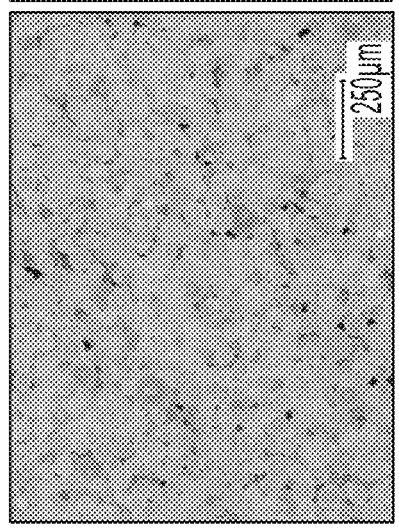
FIGS. 5A and 5B show optical images of the polyester particulates of Comparative Example 1 after laser sintering at 30% and 45% laser power, respectively, a scan rate of 40,000, and a temperature of 115° C.
Figure 5B:
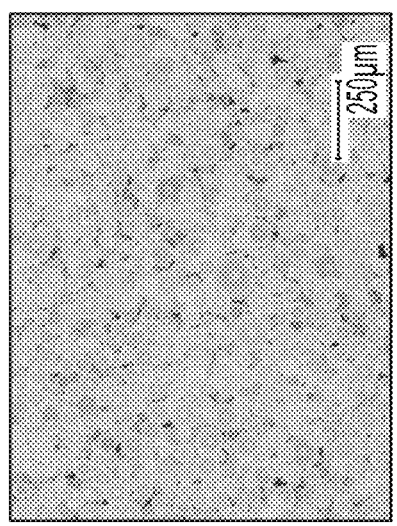
Figure 6A:
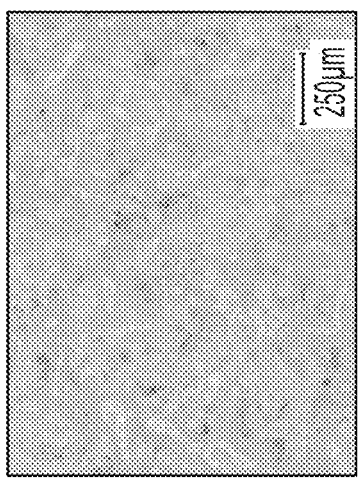
FIGS. 6A and 6B show optical images of the polyester particulates of Example 1 after laser sintering under the same conditions as Comparative Example 1.
Figure 6B:
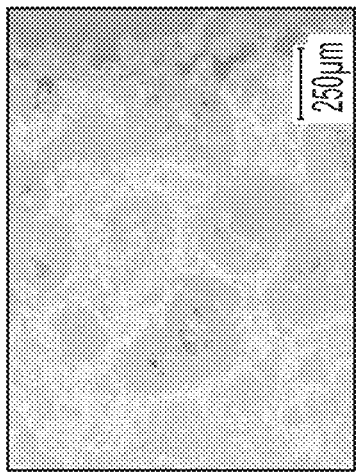
Figure 7A:
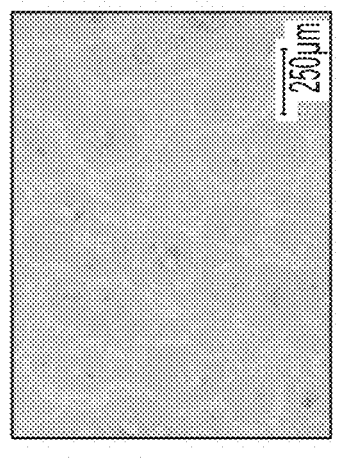
FIGS. 7A and 7B show optical images of the polyester particulates of Example 2 after laser sintering under the same conditions as Comparative Example 1.
Figure 8A:
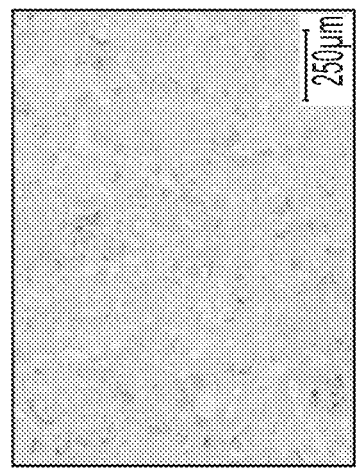
FIGS. 8A and 8B show optical images of the polyester particulates of Example 3 after laser sintering under the same conditions as Comparative Example 1, except at 25% and 35% laser power, respectively.
Figure 7B:
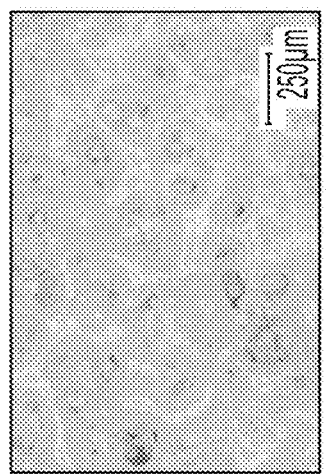
Figure 8B:
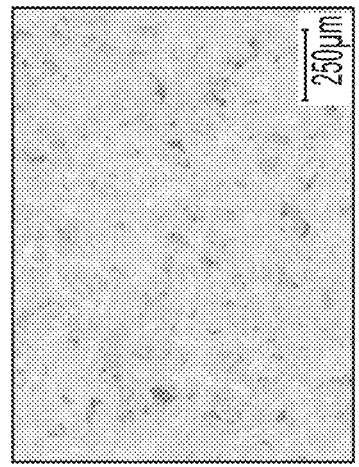

Particulate Consolidation-Polyester Particulates. As was observed for polyurethane particulates, inclusion of zinc stearate during melt emulsification had a marked impact on the ease of sintering for polyester particulates as well. FIGS. 5A and 5B show optical images of the polyester particulates of Comparative Example 1 after laser sintering at 30% and 45% laser power, respectively, a rate of 40,000 and a temperature of 115° C. FIGS. 6A and 6B show optical images of the polyester particulates of Example 1 after laser sintering, and FIGS. 7A and 7B show optical images of the polyester particulates of Example 2 after laser sintering, each under the same conditions as the comparative example. As shown in FIGS. 5A and 5B, there was still considerable particulate structure present after sintering the polyester particulates of Comparative Example 1, which lacked the zinc stearate sintering aid. The sintered samples containing zinc stearate, in contrast, showed considerably less particulate structure, indicating that more complete fusion occurred. In FIGS. 6A, 6B, 7A and 7B, the polyester particulates appeared to completely melt, likely due to the tendency of the zinc stearate sintering aid to decrease the melting point. Complete melting may be utilized to impart a glossy finish during printing, if desired, but it may lead to deformation of a printed object. The polyester particulates of Example 3, in contrast, showed increased retention of the particulate structure following sintering at 25% and 35% laser power, a scan rate of 40,000 and a temperature of 115° C., as shown in FIGS. 8A and 8B, respectively. Retention of the particulate structure was evident, but not nearly to the degree observed for Comparative Example 1. Above 35% laser power, melting of the Example 3B polyester particulates was more extensive.

The particulates of Example 3A (containing sodium decanoate instead of zinc stearate) experienced sintering at 25% laser power, but the sintering was not as complete as that occurring in the presence of zinc stearate (Example 3). The incomplete sintering of the particulates from Example 3A may be due to their comparatively larger particle size. Still, the particulates of Example 3A did experience sintering at a lower laser power than smaller particulates lacking a metal carboxylate salt altogether (Comparative Example 1).

The particulates of Example 3B (containing stearic acid instead of zinc stearate) experienced sintering between 25-35% laser power, similar to the Example 3 polyester particulates.

Figure 9A:
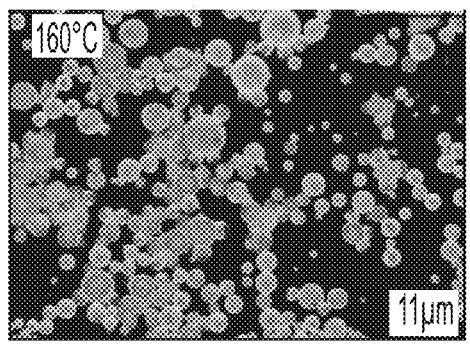
FIGS. 9A-9C show hot stage microscopy images of the polyester particulates of Comparative Example 1 at various temperatures.
Figure 9B:
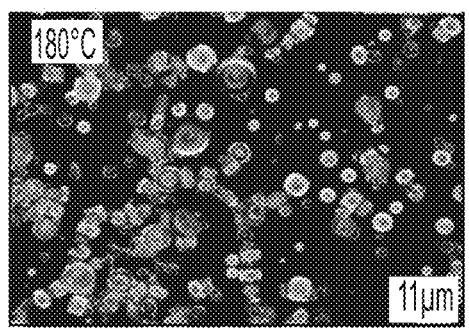
Figure 9C:
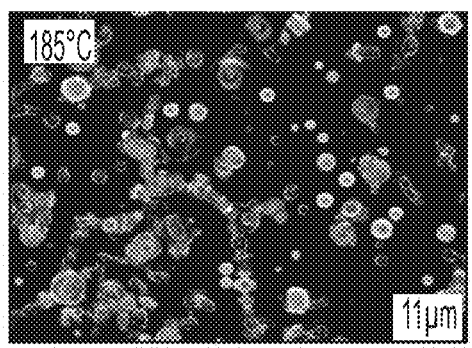
Figure 10A:
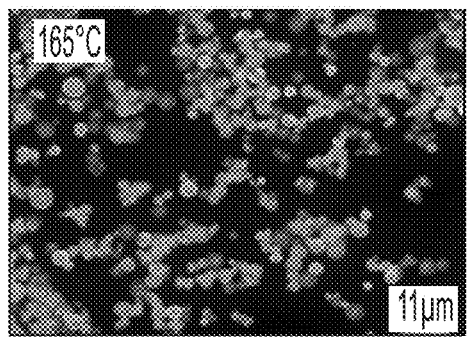
FIGS. 10A-10C show hot stage microscopy images for the polyester particulates of Example 2 at various temperatures.
Figure 10B:
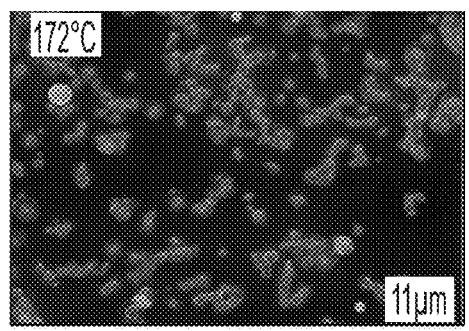
Figure 10C:
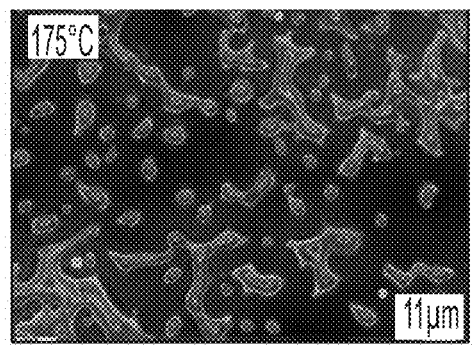

FIGS. 9A-9C show hot stage microscopy images of the polyester particulates of Comparative Example 1 at various temperatures. As shown, sintering began at about 160° C. for this sample, and flow initiation began at about 180° C. Complete flow was observed at about 185° C. FIGS. 10A-10C show hot stage microscopy images for the polyester particulates of Example 2 at various temperatures. As shown, sintering began at about 165° C. for this sample, and flow initiation began at about 172° C. Complete flow was observed at about 175° C. Thus, the zinc stearate sintering aid decreased the melting point for this sample by about 10° C., which indicates that consolidated parts may be formed at lower bed temperatures and/or lower laser powers in the presence of the zinc stearate sintering aid.

In consolidated samples made from the polyester particulates of Comparative Example 1, the sintered layers were too fragile to manipulate below 30% laser power in the absence of the zinc stearate sintering aid. Modest blocking occurred in the polyester samples containing 1.0 wt. % of the zinc stearate sintering aid, but blocking was considerably reduced or absent at lower zinc stearate loadings. Table 3 shows a comparison of sintered samples made from polyester particulates of Comparative Example 1 against those made from polyester particulates of Examples 2, 3A and 3B at various laser powers. Selective laser sintering (SLS) was performed using a Snow White SLS printer system (Sharebot). The polyester particulates of each type were deposited using the SLS printer system in a 30 mm×30 mm square and then sintered under various laser power conditions specified in Table 3. Void percentage following sintering was calculated using digital microscope software.

TABLE 3

| Entry | Laser Power (%) | Scan Rate[1] | Temp. (° C.) | Comments | % Voids |
|---|---|---|---|---|---|
| Comparative Ex. 1 | 20 | 40,000 | 115 | Sintered but fragile. Broke while picking up. | — |
| Ex. 2 | | | | Sintered. Held together. Little powder on back. | 4.91 |
| Ex. 3A | | | | No sintered area visible. Bits collected on screen. | — |
| Ex. 3B | | | | Faint sintered area. Held together. | 1.41 |
| Comparative Ex. 1 | 25 | 40,000 | 115 | Sintered but fragile. Broke while picking up. | — |
| Ex. 2 | | | | Sintered. Edges slightly lifted. Little powder on back. | 0.90 |
| Ex. 3A | | | | Sintered. Fragile. Was able to pick up. | 2.29 |
| Ex. 3B | | | | Sintered. Most powder remains on bed. | 0.55 |
| Comparative Ex. 1 | 30 | 40,000 | 115 | Sintered but fragile. Very little material on back. | 0.71 |
| Ex. 2 | | | | Sintered. Edges slightly lifted. Some powder on back. Easy to remove. | 0.32 |
| Ex. 3A | | | | Sintered. No blocking. Most powder remains in bed. | 0.76 |
| Ex. 3B | | | | Sintered. Very little powder on back. | 0.04 |
| Comparative Ex. 1 | 35 | 40,000 | 115 | Sintered. Very little material on back. | 1.31 |
| Ex. 2 | | | | Sintered. Edges slightly lifted. More powder on back. Easy to remove. | 0.34 |
| Ex. 3A | | | | Sintered. Very little powder on back. | 0.14 |
| Ex. 3B | | | | Sintered. Very little powder on back. Slight edge curl. | 0.04 |
| Comparative Ex. 1 | 40 | 40,000 | 115 | Sintered. Very little material on back. | 0.65 |
| Ex. 2 | | | | Sintered. Edges slightly lifted. More powder on back. Easy to remove. | 0.03 |
| Ex. 3A | | | | Sintered. Very little powder on back. | 0.12 |
| Ex. 3B | | | | Sintered. Very little powder on back. Slight edge curl. | 0.01 |
| Comparative Ex. 1 | 45 | 40,000 | 115 | Sintered. Very little material on back. | 0.42 |
| Ex. 2 | | | | Sintered. Edges slightly lifted. More powder on back. Easy to remove. | 0.02 |
| Ex. 3A | | | | Sintered. Very little powder on back. | 0.09 |
| Ex. 3B | | | | More edge curl. More powder removed from bed. | 0 |

[1]Multiplying the reported scan rate by 0.04 gives the scan rate in mm/s.

As shown, sintering was realized at lower laser powers in the presence of the zinc stearate sintering aid, and lower void formation resulted.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. A particulate composition comprising:
   a plurality of thermoplastic particulates comprising a thermoplastic polymer, a carboxylic acid-based sintering aid admixed with the thermoplastic polymer at a loading of about 0.05 wt. % to about 2 wt. % as measured relative to the thermoplastic polymer, and a plurality of nanoparticles at a loading of about 0.2 wt. % to about 2 wt. % as measured relative to the thermoplastic polymer;
      wherein the carboxylic acid-based sintering aid comprises a free carboxylic acid or a metal carboxylate; and
      wherein the carboxylic acid-based sintering aid is not precoated upon the nanoparticles, and at least a majority of the plurality of nanoparticles is disposed upon an outer surface of the thermoplastic particulates.

2. The particulate composition of claim 1, wherein the plurality of nanoparticles comprises oxide nanoparticles, carbon black, or any combination thereof.

3. The particulate composition of claim 2, wherein the oxide nanoparticles comprise silica nanoparticles.

4. The particulate composition of claim 1, wherein the carboxylic acid-based sintering aid comprises the metal carboxylate, and the metal carboxylate has a melting point of about 60° C. to about 300° C.

5. The particulate composition of claim 1, wherein the carboxylic acid-based sintering aid comprises the metal carboxylate, and the metal carboxylate comprises at least one salt selected from the group consisting of a metal monocarboxylate, a metal dicarboxylate, and any combination thereof.

6. The particulate composition of claim 1, wherein the carboxylic acid-based sintering aid comprises the metal carboxylate, and the metal carboxylate comprises at least one metal monocarboxylate comprising a monovalent metal cation, a divalent metal cation, or a trivalent metal cation.

7. A method comprising:
   combining a thermoplastic polymer, nanoparticles and a carboxylic acid-based sintering aid with a carrier fluid at a heating temperature at or above a melting point or a softening temperature of the thermoplastic polymer;
      wherein the thermoplastic polymer and the carrier fluid are substantially immiscible at the heating temperature;
   applying sufficient shear to disperse the thermoplastic polymer as liquefied droplets in the presence of the nanoparticles and the carboxylic acid-based sintering aid in the carrier fluid at the heating temperature;
   after liquefied droplets have formed, cooling the carrier fluid to at least a temperature at which thermoplastic particulates in a solidified state form, the thermoplastic particulates comprising the thermoplastic polymer, at least a portion of the nanoparticles, and at least a portion of the carboxylic acid-based sintering aid;
      wherein the carboxylic acid-based sintering aid is present at a loading of about 0.05 wt. % to about 2 wt. % as measured relative to thermoplastic polymer, and the nanoparticles are present at a loading of about 0.2 wt. % to about 2 wt. % as measured relative to the thermoplastic polymer;
      wherein the carboxylic acid-based sintering aid comprises a free carboxylic acid or a metal carboxylate; and
      wherein the carboxylic acid-based sintering aid is not precoated upon the nanoparticles, and at least a majority of the nanoparticles are disposed upon an outer surface of the thermoplastic particulates; and
   separating the thermoplastic particulates from the carrier fluid.

8. The method of claim 7, wherein the plurality of nanoparticles comprises oxide nanoparticles, carbon black, or any combination thereof.

9. The method of claim 8, wherein the oxide nanoparticles comprise silica nanoparticles.

10. The method of claim 7, wherein the carboxylic acid-based sintering aid comprises the metal carboxylate, and the metal carboxylate has a melting point of about 60° C. to about 300° C.

11. The method of claim 7, wherein the carboxylic acid-based sintering aid comprises the metal carboxylate, and the metal carboxylate comprises at least one salt selected from the group consisting of a metal monocarboxylate, a metal dicarboxylate, and any combination thereof.

12. The method of claim 7, wherein the carboxylic acid-based sintering aid comprises the metal carboxylate, and the metal carboxylate comprises at least one metal monocarboxylate comprising a monovalent metal cation, a divalent metal cation, or a trivalent metal cation.

13. The particulate composition of claim 1, wherein the plurality of nanoparticles is present at a loading of about 0.25 wt. % to about 1 wt. % as measured relative to the thermoplastic polymer.

14. The particulate composition of claim 13, wherein the carboxylic acid-based sintering aid is present at a loading of about 0.2 wt. % to about 1 wt. % as measured relative to the thermoplastic polymer.

15. The particulate composition of claim 1, wherein the plurality of nanoparticles is present at a loading of about 0.25 wt. % to about 0.5 wt. %, as measured relative to the thermoplastic polymer.

16. The particulate composition of claim 15, wherein the carboxylic acid-based sintering aid is present at a loading of about 0.2 wt. % to about 1 wt. % as measured relative to the thermoplastic polymer.

17. The particulate composition of claim 1, wherein the carboxylic acid-based sintering aid is present at a loading of about 0.2 wt. % to about 1 wt. % as measured relative to the thermoplastic polymer.

\* \* \* \* \*